United States Patent
Wang et al.

(10) Patent No.: US 10,281,104 B2
(45) Date of Patent: May 7, 2019

(54) LIGHT-PROJECTING DEVICE

(71) Applicant: CHIAN YIH OPTOTECH CO., LTD., Mial-Li Hsien (TW)

(72) Inventors: Cheng Wang, Taipei (TW); Ming-Feng Kuo, New Taipei (TW)

(73) Assignee: CHIAN YIH OPTOTECH CO., LTD., Mial-Li Hsien (TW)

( * ) Notice: Subject to any disclaimer, the term of this patent is extended or adjusted under 35 U.S.C. 154(b) by 0 days.

(21) Appl. No.: 15/942,610

(22) Filed: Apr. 2, 2018

(65) Prior Publication Data

US 2018/0292062 A1    Oct. 11, 2018

Related U.S. Application Data

(60) Provisional application No. 62/481,527, filed on Apr. 4, 2017.

(51) Int. Cl.
*F21S 41/25*    (2018.01)
*G02B 27/09*    (2006.01)
*F21S 41/32*    (2018.01)

(52) U.S. Cl.
CPC ............... *F21S 41/25* (2018.01); *F21S 41/32* (2018.01); *G02B 27/0955* (2013.01); *G02B 27/0977* (2013.01)

(58) Field of Classification Search
CPC ...... F21S 41/25; F21S 41/32; G02B 27/0955; G02B 27/0977

USPC ....... 362/537, 538, 543, 544, 545, 517, 518, 362/346, 297

See application file for complete search history.

(56) References Cited

U.S. PATENT DOCUMENTS

| | | | | |
|---|---|---|---|---|
| 2006/0215415 A1* | 9/2006 | Suzuki | ................... | F21S 41/155 362/539 |
| 2007/0236953 A1* | 10/2007 | Nakazawa | ........... | B60Q 1/0041 362/544 |
| 2008/0025036 A1* | 1/2008 | Takada | ...................... | B60Q 1/12 362/523 |
| 2009/0097269 A1* | 4/2009 | Stauss | ...................... | F21V 29/74 362/539 |
| 2009/0231874 A1* | 9/2009 | Kishimoto | ............... | B60Q 1/04 362/538 |
| 2009/0257240 A1* | 10/2009 | Koike | ................... | F21S 41/275 362/538 |
| 2010/0246203 A1* | 9/2010 | Chen | ..................... | F21S 41/147 362/538 |

* cited by examiner

*Primary Examiner* — Laura K Tso
(74) *Attorney, Agent, or Firm* — Li & Cai Intellectual Property (USA) Office

(57) ABSTRACT

A light-projecting device includes a base unit, a light-emitting unit, a first reflecting unit and a lens unit. The light-emitting unit is disposed on the base unit. The light-emitting unit includes a first light-emitting structure, and the first light-emitting structure includes a first light-emitting surface. The first reflecting unit is disposed on the base unit and corresponding to the light-emitting unit. The lens unit is corresponding to the first reflecting unit. The lens unit includes a lens optical axis. The first light-emitting surface is inclined relative to the lens optical axis to improve the light-concentrating efficiency of the light-projecting device.

16 Claims, 28 Drawing Sheets

LIGHT-PROJECTING DEVICE

BACKGROUND OF THE DISCLOSURE

1. Field of the Disclosure

The instant disclosure relates to a light-projecting device, and more particularly to a light-projecting device that can be applied to a vehicle light device.

2. Description of Related Art

A conventional vehicle light device, i.e., a high-beam light, a high-beam auxiliary light or a search light, demands for light condensation so as to achieve the purpose of long range illumination.

The "vehicle light device" disclosed in Taiwan Patent No. M536630 includes a light source S that is parallel to an optical axis I. In addition, a first reflecting surface 811 of a first reflecting portion 810 and a second reflecting surface 821 of a second reflecting portion 820, as shown in FIG. 3A of the patent, do not completely shield the light source S. In such condition, the light generated from the light source S cannot be completely reflected by the first reflecting portion 810 and the second reflecting surface 821, so that only a small portion of the light projects to a lens 200. In other words, the vehicle light device has a poor light-condensing effect, that is to say, it has a poor light-absorbing efficiency.

Therefore, there is an urgent need to provide a light-projecting device having high light-concentrating efficiency so as to redeem the aforesaid deficiencies.

SUMMARY OF THE DISCLOSURE

In order to solve the aforesaid technical problems, the instant disclosure provides a light-projecting device.

One of the embodiments of the instant disclosure provides a light-projecting device that includes a base unit, a light-emitting unit, a first reflecting unit, and a lens unit. The light-emitting unit is disposed on the base unit and includes a first light-emitting structure. The first light-emitting structure has a first light-emitting surface. The first reflecting unit is disposed on the base unit and corresponds in position to the light-emitting unit. The lens unit corresponds in position to the first reflecting unit and has a lens optical axis. The first light-emitting surface is inclined relative to the lens optical axis.

One of the advantages of the instant disclosure is that the light-projecting device can utilize the technical solution of "the first light-emitting surface being inclined relative to the lens optical axis" to enhance the light condensing effect of the light-projecting device.

To further understand the techniques, means and effects of the instant disclosure, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DETAILED DESCRIPTION OF EXEMPLARY EMBODIMENTS

Embodiments of a light-projecting device according to the instant disclosure are described herein. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Notably, the terms first, second, third, etc., may be used herein to describe various elements or signals, but these elements or signals should not be affected by such elements or terms. Such terminology is used to distinguish one element from another or a signal with another signal. Further, the term "or" as used herein in the case may include any one or combinations of the associated listed items.

First Embodiment

Figure 8:
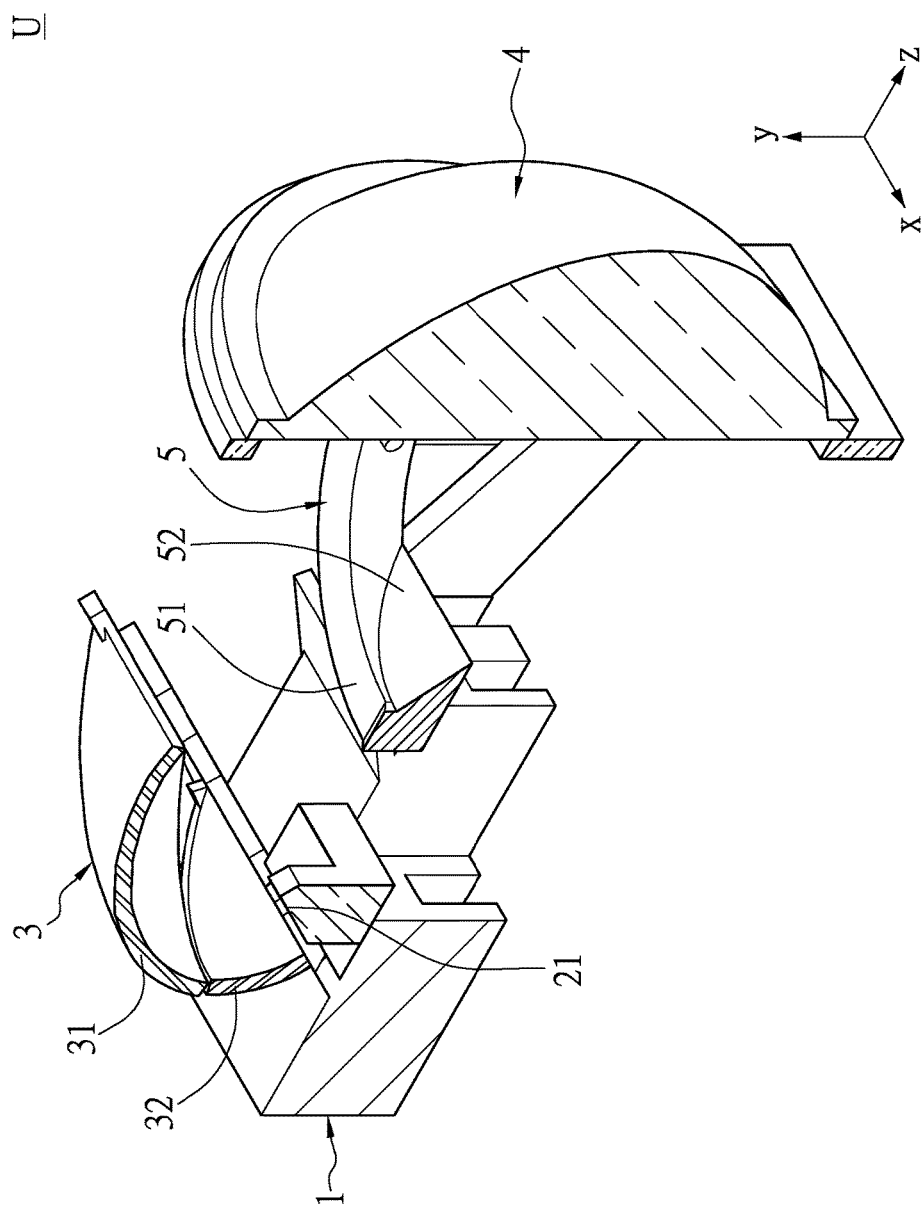
FIG. 8 is a three-dimensional schematic cross-sectional view of the light-projecting device according to the first embodiment of the instant disclosure.

Referring to FIGS. 1 to 8, FIGS. 1 to 7 are three-dimensional schematic views of the light-projecting device according to the first embodiment of the instant disclosure, and FIG. 8 is a three-dimensional cross-sectional schematic view of the light-projecting device according to the first embodiment of the instant disclosure. The light-projecting device U includes a base unit 1, a light-emitting unit 2, a first reflecting unit 3, and a lens unit 4. For example, the light-projecting device U is able to be applied to a vehicle headlight, but is not limited thereto.

Referring to FIGS. 1 to 8, it should be noted that the base unit 1 can include a plurality of heat-dissipating structures (not numbered). The heat-dissipating structures are, for example, heat-dissipating fins and can enhance the heat-dissipating effect of the light-projecting device U. In addition, the light-emitting unit 2 can be disposed on the base unit 1. The light-emitting unit 2 can include a first light-emitting structure 21 that can have a first light-emitting surface 21S. In the present embodiment, the first light-emitting structure 21 can be disposed on a first supporting surface 11 of the base unit 1. In addition, the first light-emitting structure 21 is, for example, a light-emitting diode (LED). Therefore, the first light-emitting surface 21S can act as a uniform surface light source. In the present embodiment, the first light-emitting structure 21 can be a lambert radiator or that resembling a lambert radiator. The first light-emitting surface 21S can act as a lambert light source, and it can emit at least a first light L1 having an angle between −80 to 80 degrees. Preferably, the first light-emitting surface 21S, which acts as a lambert light source, can emit at least a first light L1 having an angle between −90 to 90 degrees. It should be noted that, a direction at an angle of 0 degree to the lambert light source can be a direction along the normal line of the first light-emitting surface 21S, and a direction at an angle of −90 or 90 degrees to the lambert light source can be a direction along the tangent line of the first light-emitting surface 21S. In the present disclosure, a location at −90 degrees relative to the first light-emitting surface 21S is defined as the side away from the lens unit 4, and a location at 90 degrees relative to the first light-emitting surface 21S is defined as the side adjacent to the lens unit 4.

The first reflecting unit 3 can be disposed on the base unit 1 and correspond in position to the light-emitting unit 2, and the lens unit 4 can correspond in position to the first reflecting unit 3. In the first embodiment, the lens unit 4 can be disposed on the base unit 1. In an example of the first embodiment, the first reflecting unit 3 can include a first reflecting structure 31 and a second reflecting structure 32, and the first reflecting structure 31 has a different curvature from the second reflecting structure 32. The first reflecting structure 31 can be composed of a plurality of curved surfaces of different curvatures or only one curved surface. For example, the first reflecting structure 31 can be a reflecting structure having elliptical-based surface(s) with curvature(s). In addition, the second reflecting structure 32 can also be composed of a plurality of curved surfaces of different curvatures or only one curved surface. For example, the second reflecting structure 32 can be a reflecting structure having a free curved surface or elliptical-based surface(s) with curvature, but the instant disclosure is not limited thereto. It should be noted that, in the example shown in FIG. 11, the first reflecting unit 3 needs not have the second reflecting structure 32. That is to say, the first reflecting structure 31 has a same curvature as the second reflecting structure 32, or the first and second reflecting structures 31 and 32 are so disposed that they have continuous curvatures.

Figure 9:
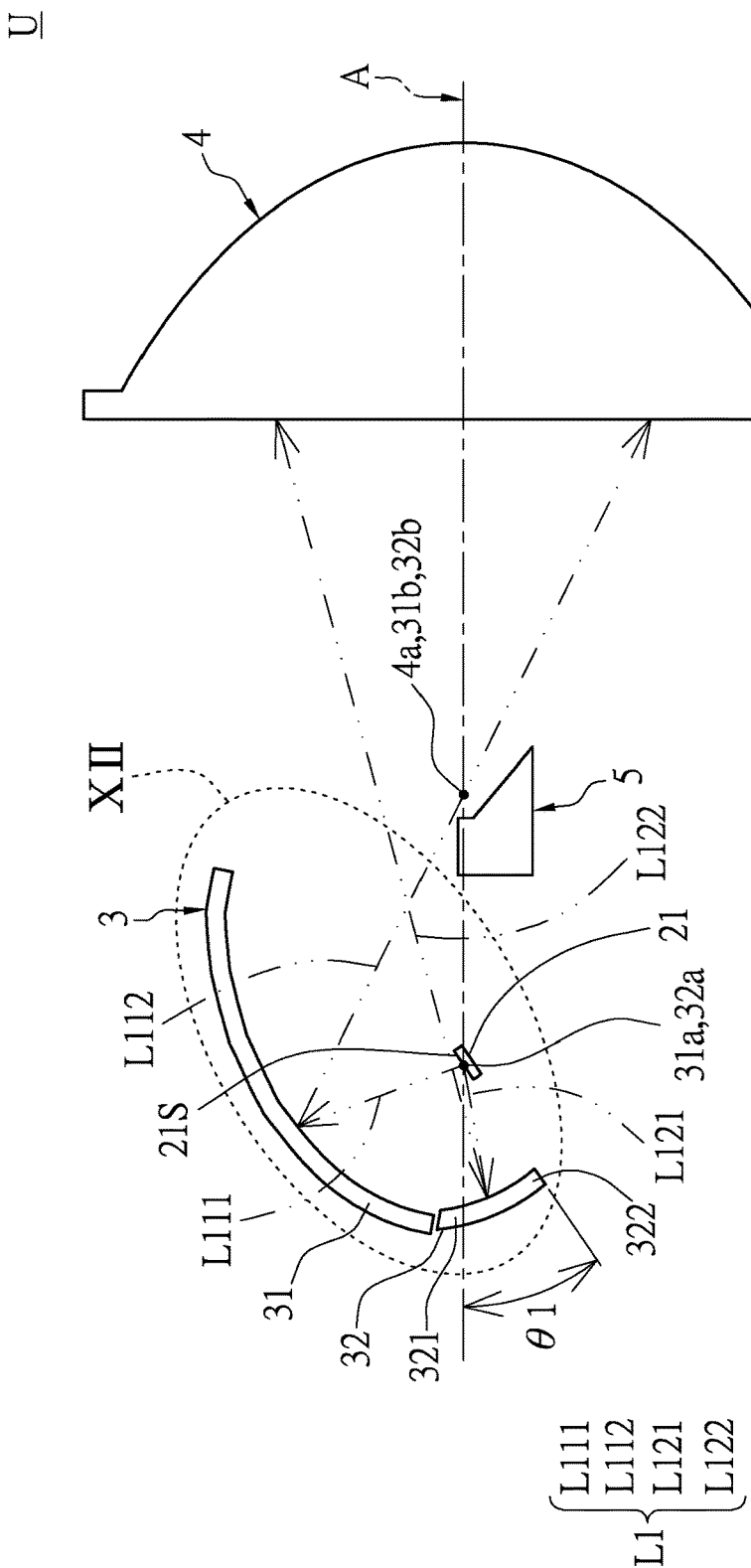
FIG. 9 is a schematic view showing an example of the light path inside the light-projecting device according to the first embodiment of the instant disclosure.
Figure 10:
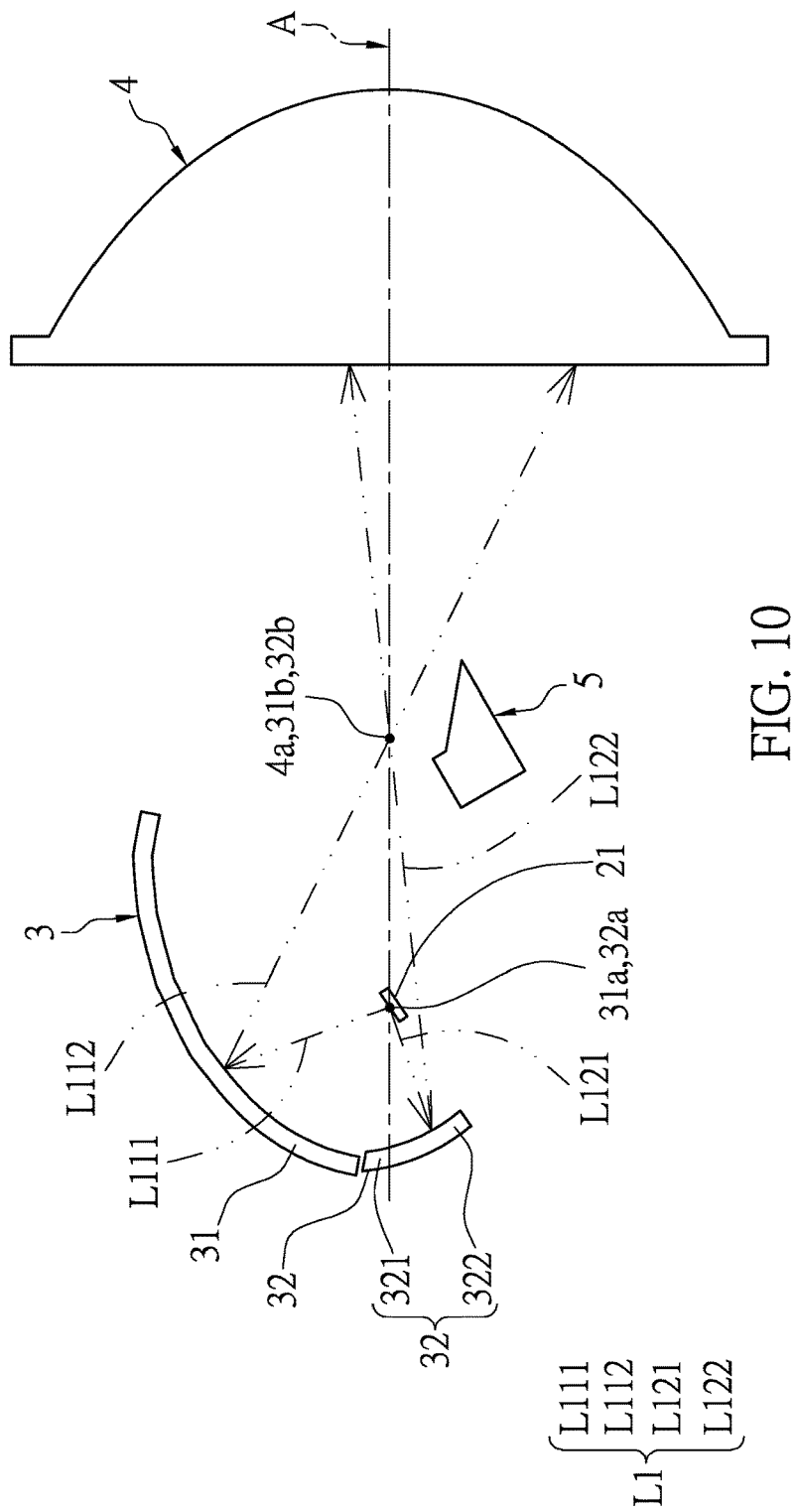
FIG. 10 is another schematic view showing the example of the light path inside the light-projecting device according to the first embodiment of the instant disclosure.

Furthermore, the light-projecting device U can further include a light cut-off unit 5. The light cut-off unit 5 can be disposed on the base unit 1. A first light L1, as shown in FIG. 9, generated from the first light-emitting structure 21 is selectively shielded by the light cut-off unit 5 to produce a lighting pattern with a cut-off line. In other words, the light cut-off unit 5 has a light cut-off plate 51 in which a cut-off edge (not numbered) for producing lighting patterns in compliance with regulations. It should be noted that the light cut-off unit 5 can be either in a fixed type (not shown), i.e., cannot rotate, or in a movable type. When the light cut-off unit 5 is in the fixed type, the light-projecting device U can produce the lighting patterns in compliance with the regulations of low-beam headlight. In addition, when the light cut-off unit 5 is in the movable type, the light cut-off unit 5 can be disposed on the base unit 1 to reciprocatingly swing around a rotation axis I, so as to produce the lighting patterns in compliance with the regulations of low-beam and high-beam headlight. That is to say, the light cut-off unit 5 can reciprocatingly swing between a first position (i.e., low-beam position) and a second position (i.e., high-beam position). Accordingly, the light-projecting device U can be switched between a low-beam state and a high-beam state by the rotation of the light cut-off unit 5 as shown in FIGS. 9 and 10. It should be noted that the light cut-off unit 5 of the instant disclosure is exampled as a movable-type light cut-off plate, but is not limited thereto.

Referring to FIGS. 1 to 8 along with FIG. 9, in which FIG. 9 is a schematic view showing the light path inside the light-projecting device according to the first embodiment of the instant disclosure and the first position of the light cut-off unit 5. More specifically, the lens unit 4 can have a lens optical axis A that can pass through the first light-emitting surface 21S or be in the vicinity of the first light-emitting surface 21S. For example, at least a portion of the first light-emitting surface 21S, as shown in FIG. 8, is arranged beneath the lens optical axis A. In the present embodiment, the first light-emitting surface 21S is inclined relative to the lens optical axis A, such that the first reflecting unit 3 can shield the first light L1 generated from the first light-emitting structure 21 as much as possible.

Referring to FIG. 9, in the present embodiment, the first reflecting unit 3 can include a first reflecting structure 31 and a second reflecting structure 32. The first reflecting structure 31 can have a first focal point 31a and a second focal point 31b corresponding in position to the first focal point 31a. The second reflecting structure 32 can have a third focal point 32a and a fourth focal point 32b corresponding in position to the third focal point 32a. The lens unit 4 can further have a lens focal point 4a that is positioned on the lens optical axis A. The first light-emitting structure 21 can be disposed in positional correspondence with the first focal point 31a of the first reflecting structure 31, and also be disposed in positional correspondence with the third focal point 32a of the second reflecting structure 32. In addition, the second focal point 31b of the first reflecting structure 31 can coincide with or be in the vicinity of the lens focal point 4a. The fourth focal point 32b of the second reflecting structure 32 can also coincide with or be in the vicinity of the lens focal point 4a. Preferably, the first light-emitting structure 21 can be disposed in exact positional correspondence with the first focal point 31a and the third focal point 32a. In addition, the second focal point 31b and the fourth focal point 32b can coincide with or be in the vicinity of the lens focal point 4a, but the instant disclosure is not limited thereto.

In other embodiments, the second reflecting structure 32 can have a non-elliptical curvature and be a non-spherical free curved surface. It should be noted that the light, which projects to the second reflecting structure 32 from the first light-emitting structure 21, still can be reflected by the second reflecting structure 32 to project to the lens unit 4. Preferably, the lens optical axis A can pass through the second reflecting structure 32, such that a portion of the second reflecting structure 32 is located at one side of the lens optical axis A and the other portion of the second reflecting structure 32 is located at another side of the lens optical axis A. That is to say, the second reflecting structure 32 can have a first end portion 321 arranged above the lens optical axis A and a second end portion 322 arranged below the lens optical axis A.

Referring to FIG. 9, the first light-emitting structure 21 can generate a first light L1 in the low-beam state. The first light L1 can include a first projection light L111 projecting toward the first reflecting structure 31 and a second projection light L121 projecting toward the second reflecting structure 32. The first projection light L111 can be reflected by the first reflecting structure 31 to produce a first reflection light L112 projecting toward the lens unit 4. The second projection light L121 can be reflected by the second reflecting structure 32 to produce a second reflection light L122 projecting toward the lens unit 4. It should be noted that, a portion of the first reflection light L112 and a portion of the second reflection light L122 can be selectively shielded by the light cut-off unit 5 that is in the first position, such that the light-projecting device U can produce lighting patterns in compliance with the regulations of low-beam headlight. Referring to FIG. 10, the first light-emitting structure 21 can also generate a first light L1 in the high-beam state. It should be noted that a portion of the first reflection light L112 and a portion of the second reflection light L122 will not be shielded by the light cut-off unit 5 that is in the second position, such that the light-projecting device U can produce lighting patterns in compliance with the regulations of high-beam headlight.

Figure 11:
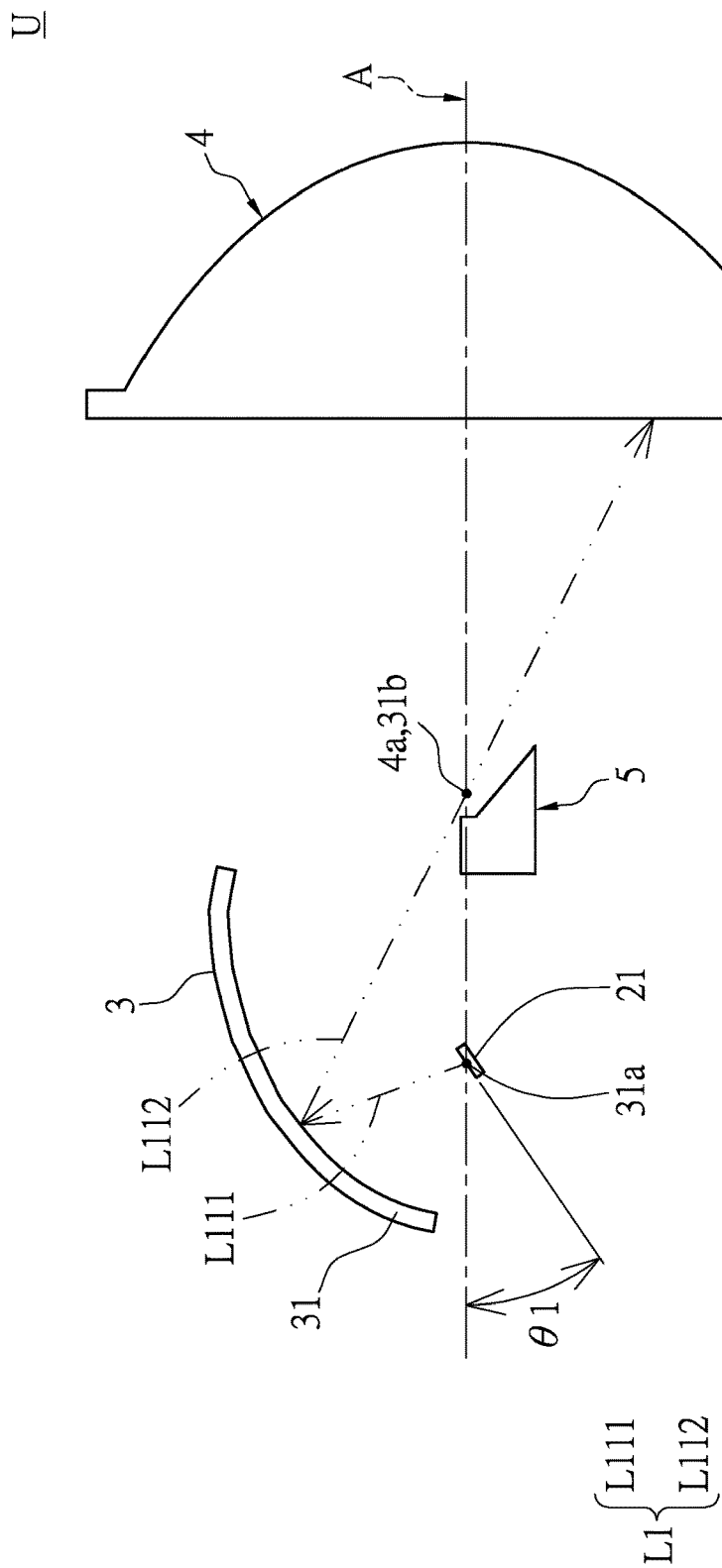
FIG. 11 is a schematic view showing another example of the light path inside the light-projecting device according to the first embodiment of the instant disclosure.

Referring to FIG. 11, in other embodiments, the first reflecting unit 3 can include only the first reflecting structure 31. The first light-emitting surface 21S can be inclined relative to the lens optical axis A, such that the first reflecting unit 3 can shield the first light L1 generated from the first light-emitting structure 21 as much as possible. It should be noted that, although the first reflecting unit 3 of FIG. 11 can include only the first reflecting structure 31 not completely shielding the first light L1 of the first light-emitting structure 21, FIG. 11 is for illustration purpose only, and in practice, the first reflecting unit 3 can have an increased size to shield the first light L1 of the first light-emitting structure 21 as much as possible according to practical requirements. In addition, the first light-emitting surface 21S can have a predetermined angle θ1 of between 15 and 60 degrees relative to the lens optical axis A, preferably between 40 and 50 degrees, more preferably of 45 degrees. That is to say, the normal line of the first light-emitting surface 21S extends at an inclination angle toward a direction at the back side of the lens unit 4. As mentioned above, the description about the light paths of the first projection light 111 and the second projection light 112 is omitted hereby.

Figure 12:
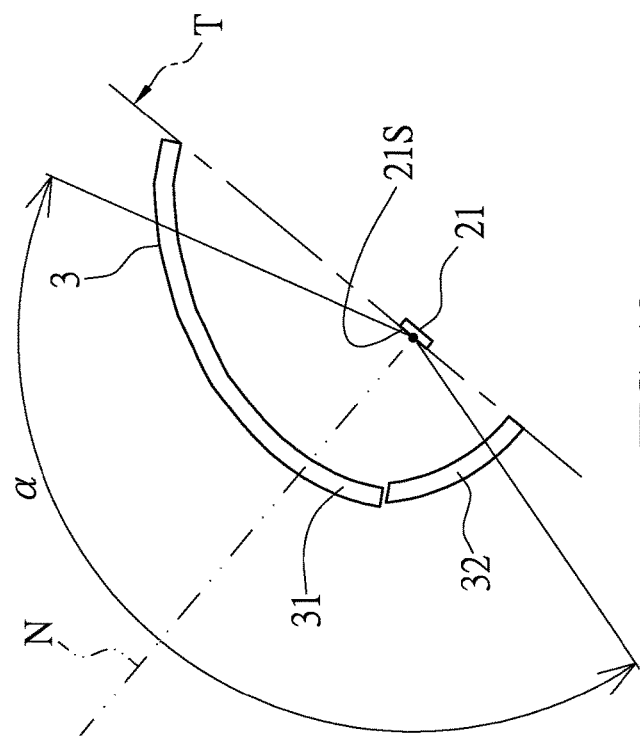
FIG. 12 is a schematic enlarged view of the section XII shown in FIG. 9.
Figure 13:
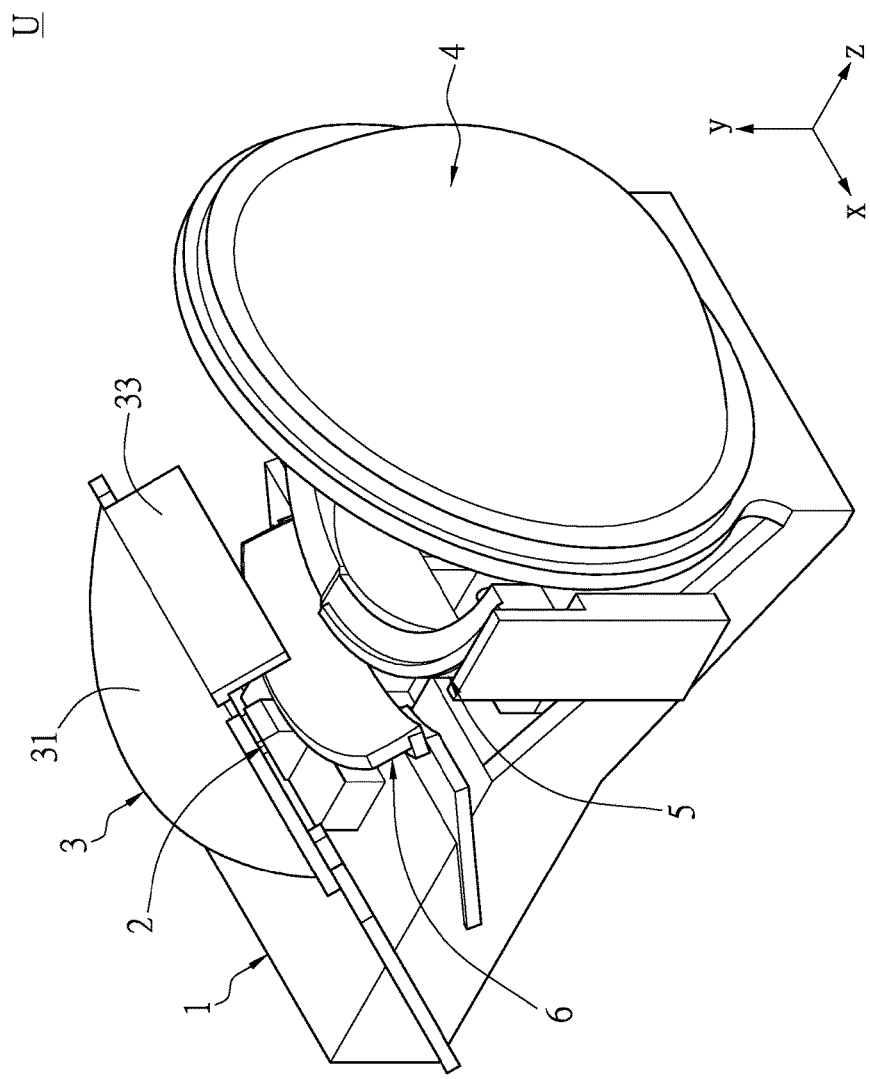
FIG. 13 is a three-dimensional schematic assembled view of a light-projecting device according to the second embodiment of the instant disclosure.
Figure 14:
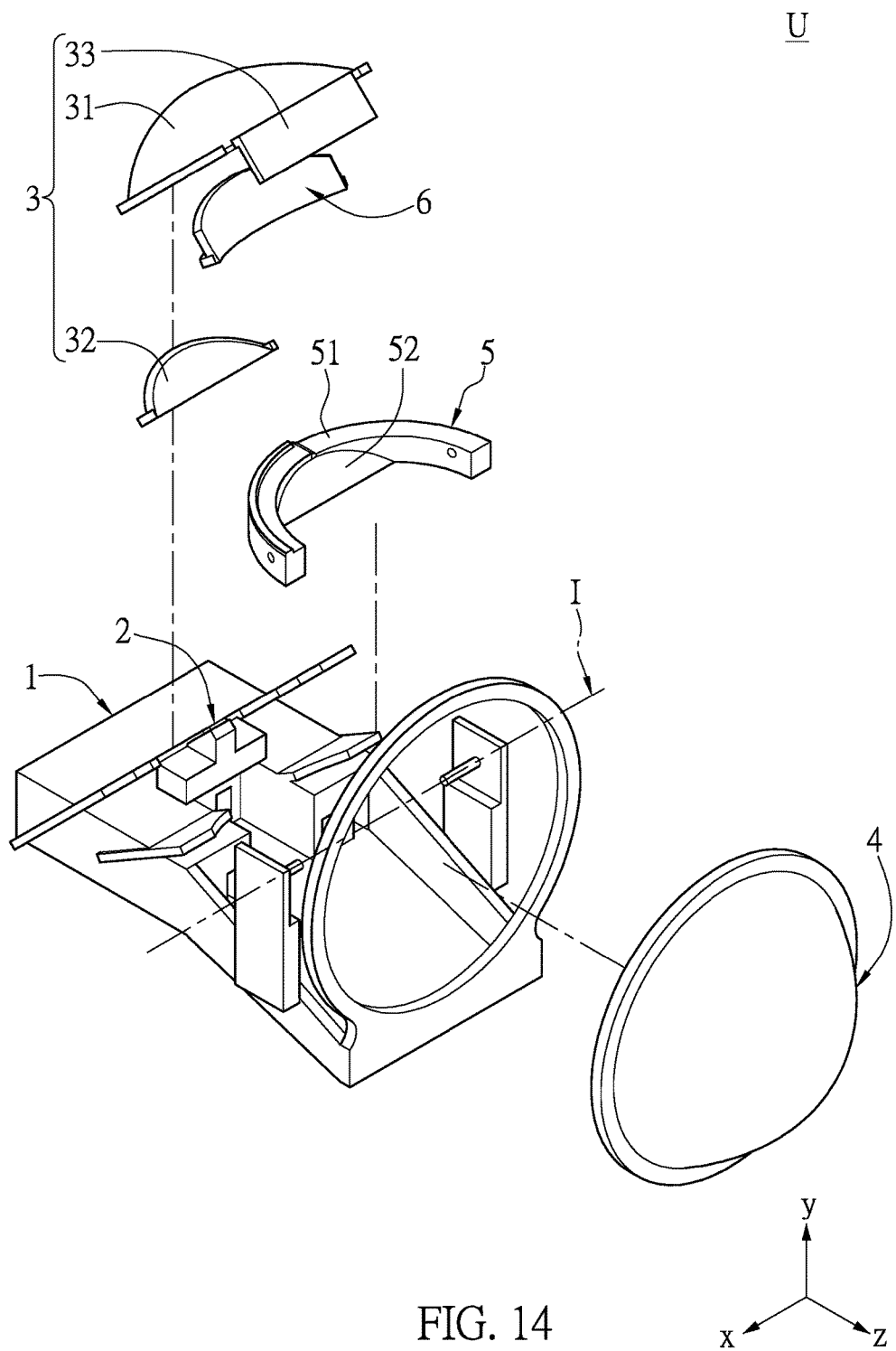
FIG. 14 is a three-dimensional schematic exploded view of the light-projecting device according to the second embodiment of the instant disclosure.
Figure 15:
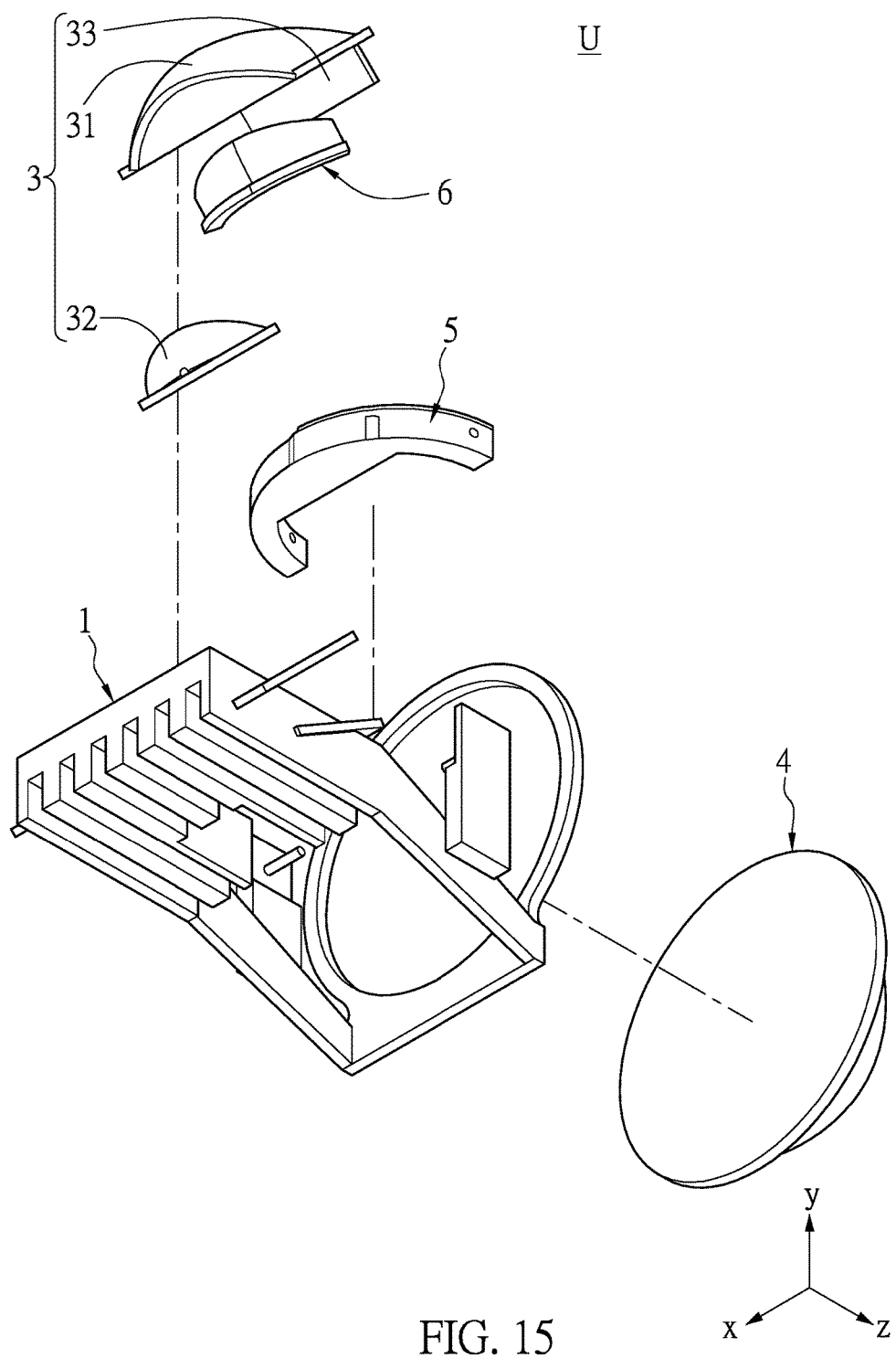
FIG. 15 is another three-dimensional schematic exploded view of the light-projecting device according to the second embodiment of the instant disclosure.

Reference is made to FIG. 12 that is an enlarged schematic view of the section XII shown in FIG. 9. In the present embodiment, a normal line N and a tangent line T can be defined relative to the first light-emitting surface 21S. The direction at an angle of −90 or 90 degrees to the lambert light source can be a direction along the tangent line of the first light-emitting surface 21S. More specifically, the first reflecting unit 3 is shaped and positioned to encircle the lambert light source of the first light-emitting structure 21 by a covering angle α. In the present embodiment, the first reflecting unit 3 can at least shield a portion of the first light L1 of the lambert light source that is at an angle between −70 and 70 degrees. That is to say, the covering angle α can range between −70 and 70 degrees. Preferably, the first reflecting unit 3 can at least shield a portion of the first light L1 of the lambert light source that is at an angle between −85 and 85 degrees. That is to say, the covering angle α can range between −85 and 85 degrees. More preferably, to maximize the light-absorbing effect, the first reflecting unit 3 can at least shield a portion of the first light L1 of the lambert light source that is at an angle between −90 and 90 degrees. That is to say, the covering angle α can range between −90 and 90 degrees. In other embodiments, the first reflecting unit 3 shields at least 60% of the first light L1 of the lambert light source. Preferably, the first reflecting unit 3 can shield 60% to 85% of the light, more preferably 85% to 95% of the first light L1, even more preferably 95% of the first light L1, emitted from the first light-emitting surface 21S of the first light-emitting structure 21.

For example, the first reflecting structure 31 of the first reflecting unit 3 can at least shield a portion of the first light L1 of the lambert light source of the first light-emitting structure 21 that is at an angle between −20 and 80 degrees. The second reflecting structure 32 of the first reflecting unit 3 can at least shield a portion of the first light L1 of the lambert light source of the first light-emitting structure 21 that is at an angle between −80 and −40 degrees. Preferably, the first reflecting structure 31 of the first reflecting unit 3 can at least shield a portion of the first light L1 of the lambert light source of the first light-emitting structure 21 that is at an angle between −30 and 90 degrees. The second reflecting structure 32 of the first reflecting unit 3 can at least shield a portion of the first light L1 of the lambert light source of the first light-emitting structure 21 that is at an angle between −90 and −30 degrees. In other embodiments, the first reflecting structure 31 of the first reflecting unit 3 can at least shield a portion of the first light L1 of the lambert light source of the first light-emitting structure 21 that is at an angle between −20 and 90 degrees. The second reflecting structure 32 of the first reflecting unit 3 can at least shield a portion of the first light L1 of the lambert light source of the first light-emitting structure 21 that is at an angle between −90 to −40 degrees. However, there is no limitation to the covering angle α of the first reflecting unit 3.

Figure 1:
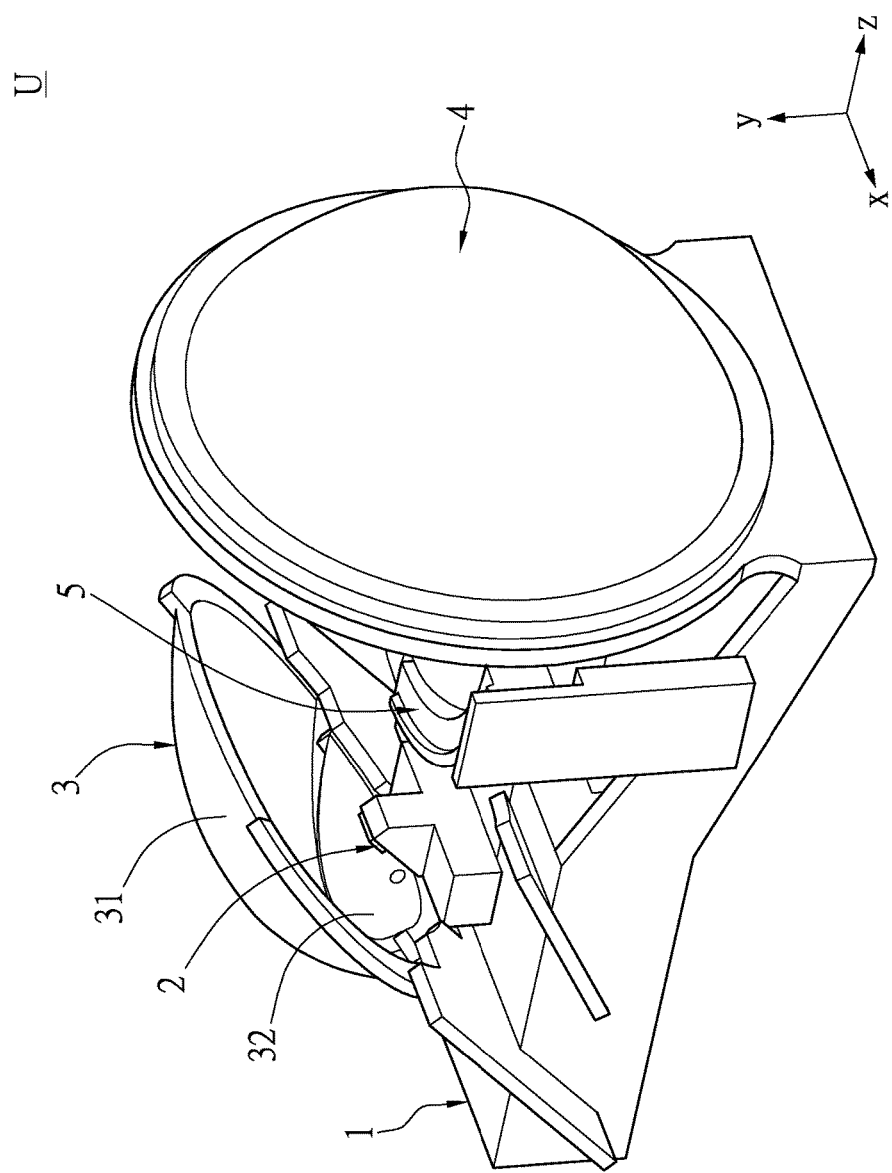
FIG. 1 is a three-dimensional schematic assembled view of a light-projecting device according to the first embodiment of the instant disclosure.
Figure 2:
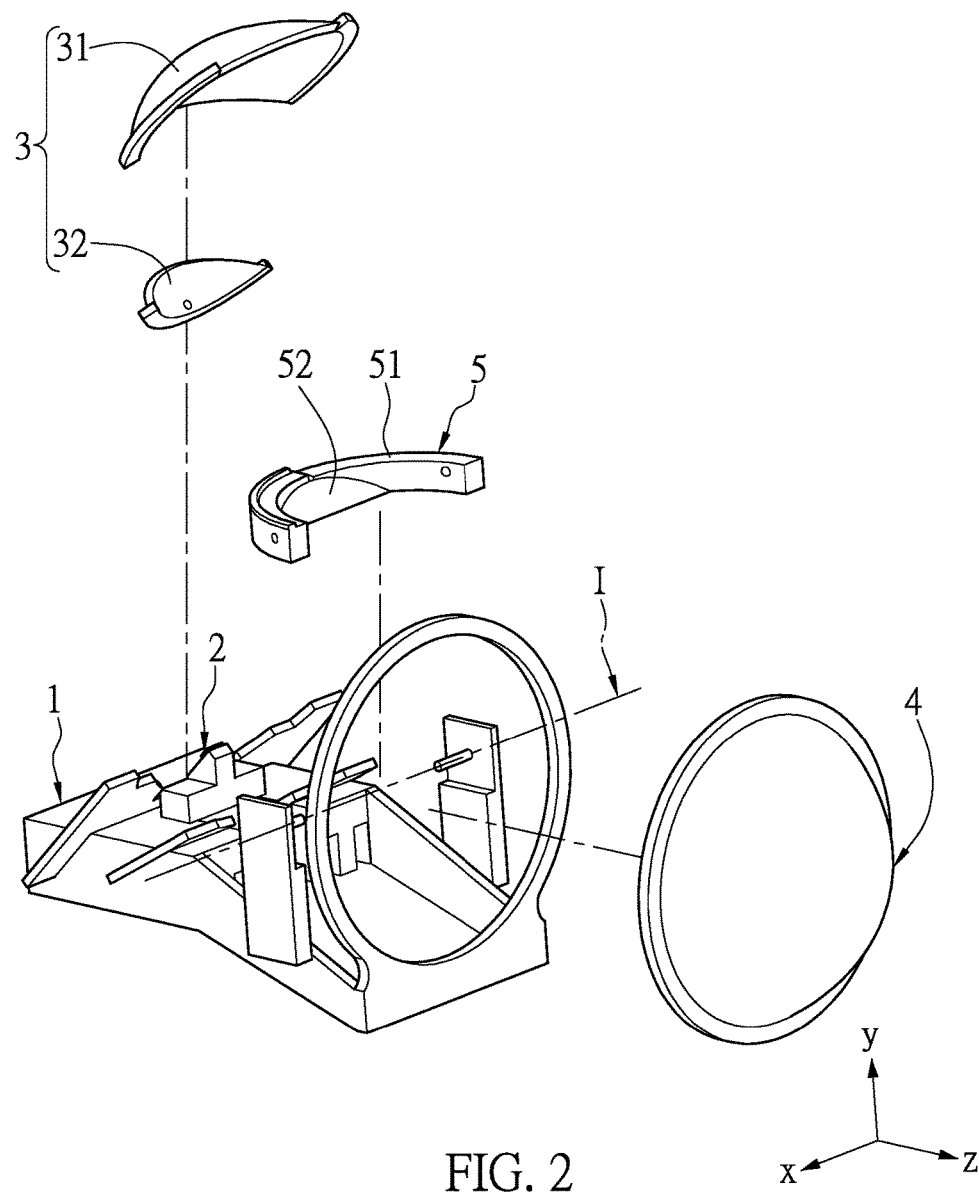
FIG. 2 is a three-dimensional schematic exploded view of the light-projecting device according to the first embodiment of the instant disclosure.
Figure 3:
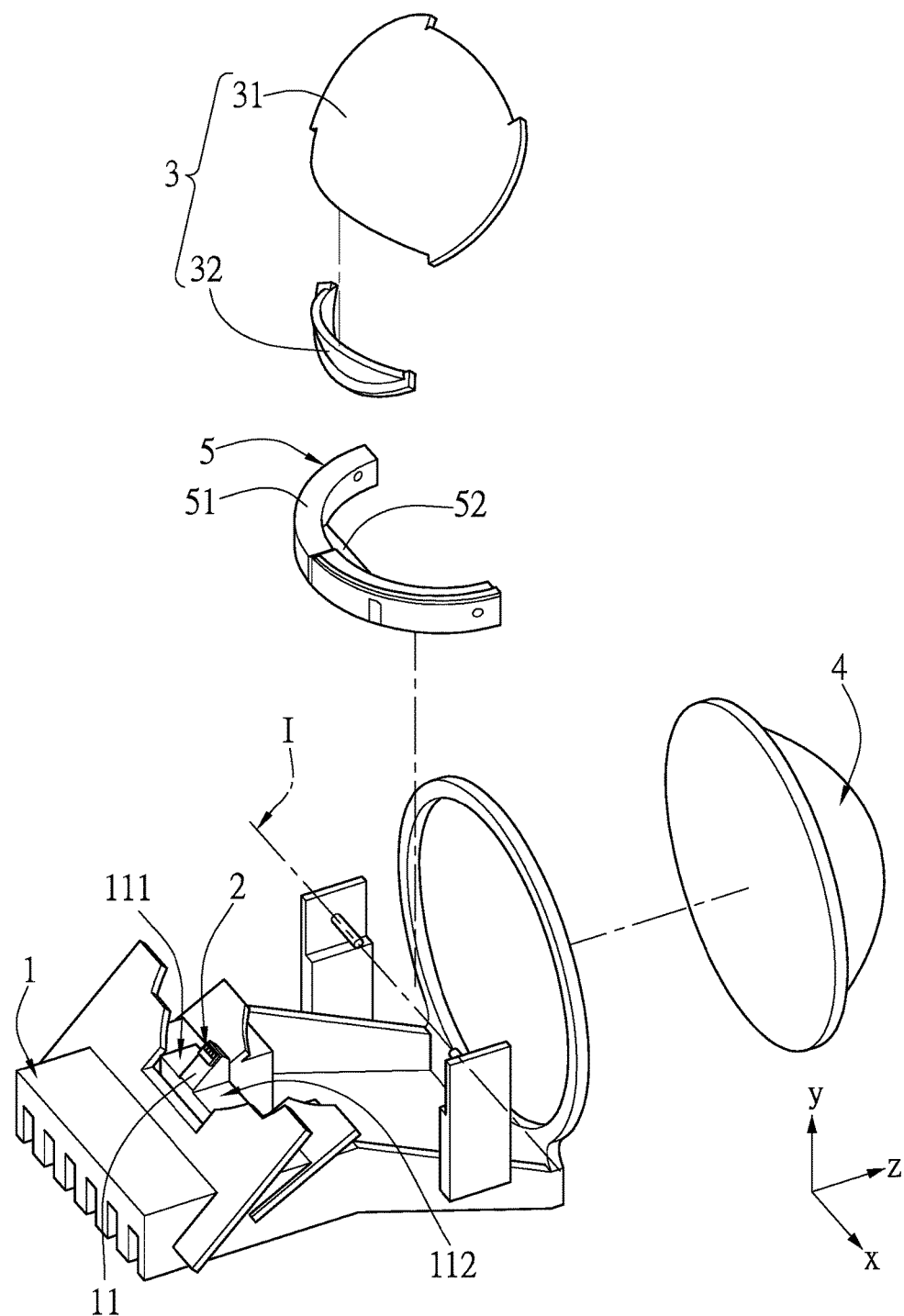
FIG. 3 is another three-dimensional schematic exploded view of the light-projecting device according to the first embodiment of the instant disclosure.
Figure 4:
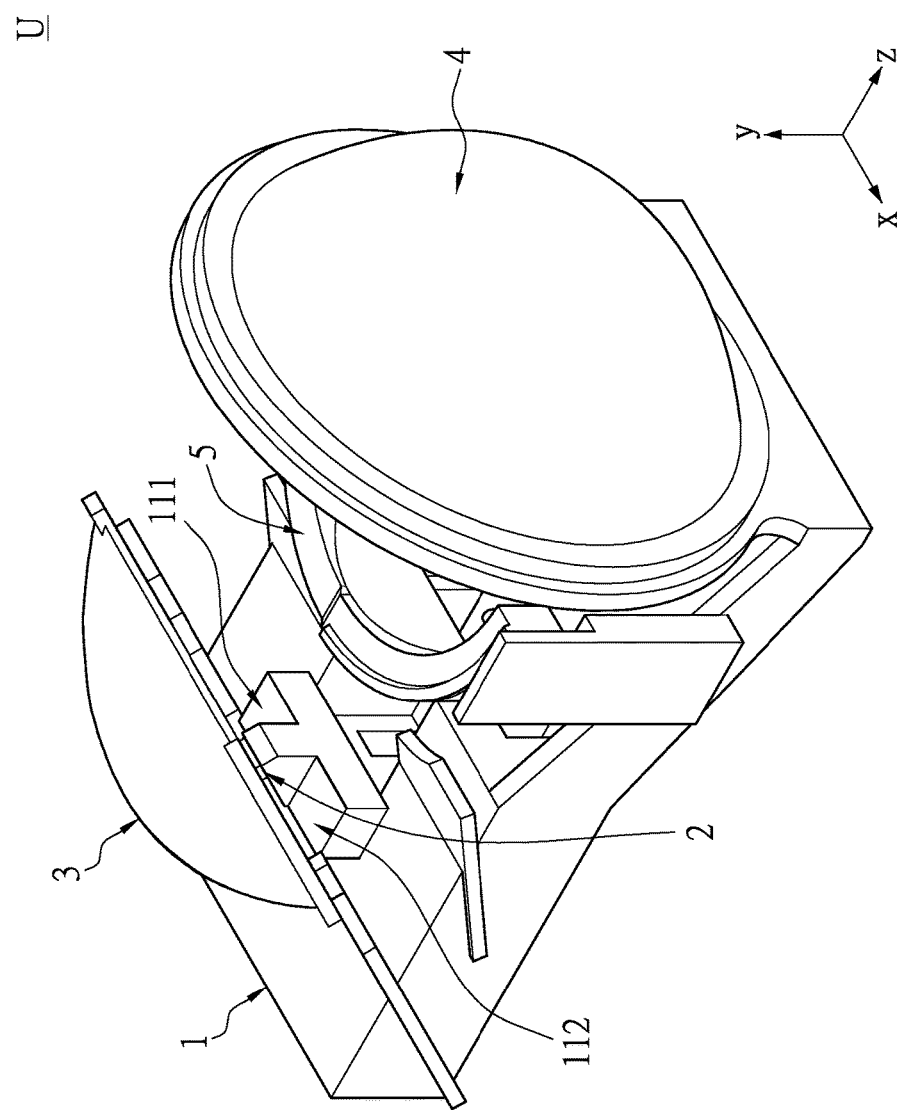
FIG. 4 is another three-dimensional schematic assembled view of the light-projecting device according to the first embodiment of the instant disclosure.
Figure 5:
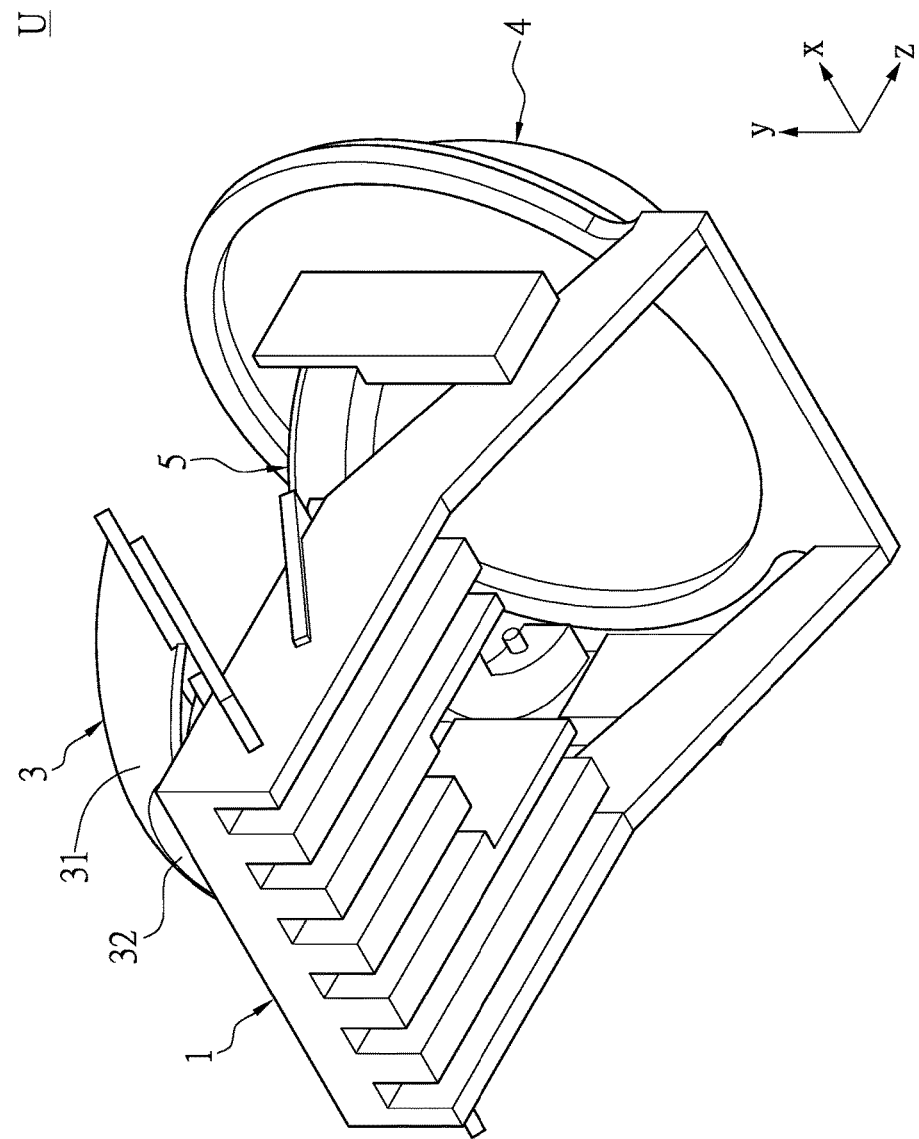
FIG. 5 is still another three-dimensional schematic assembled view of the light-projecting device according to the first embodiment of the instant disclosure.
Figure 6:
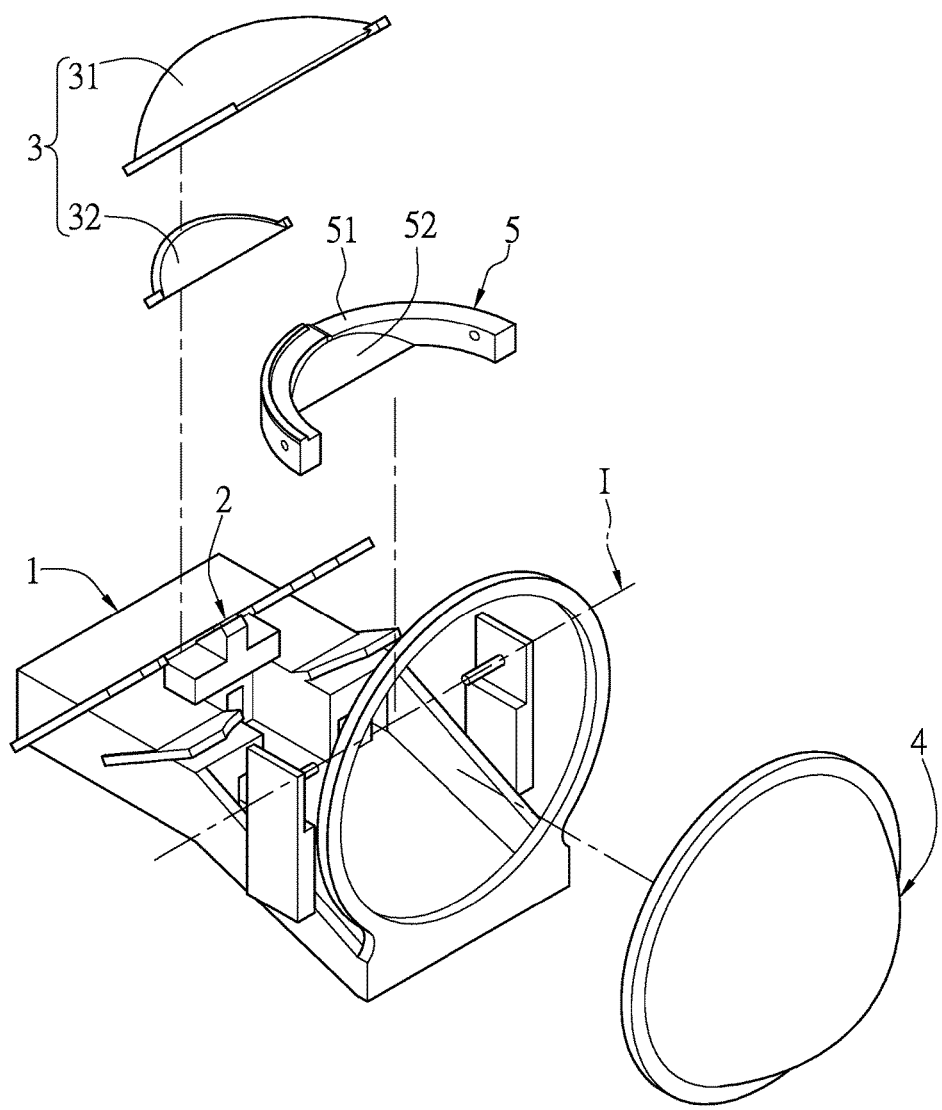
FIG. 6 is still another three-dimensional schematic exploded view of the light-projecting device according to the first embodiment of the instant disclosure.
Figure 7:
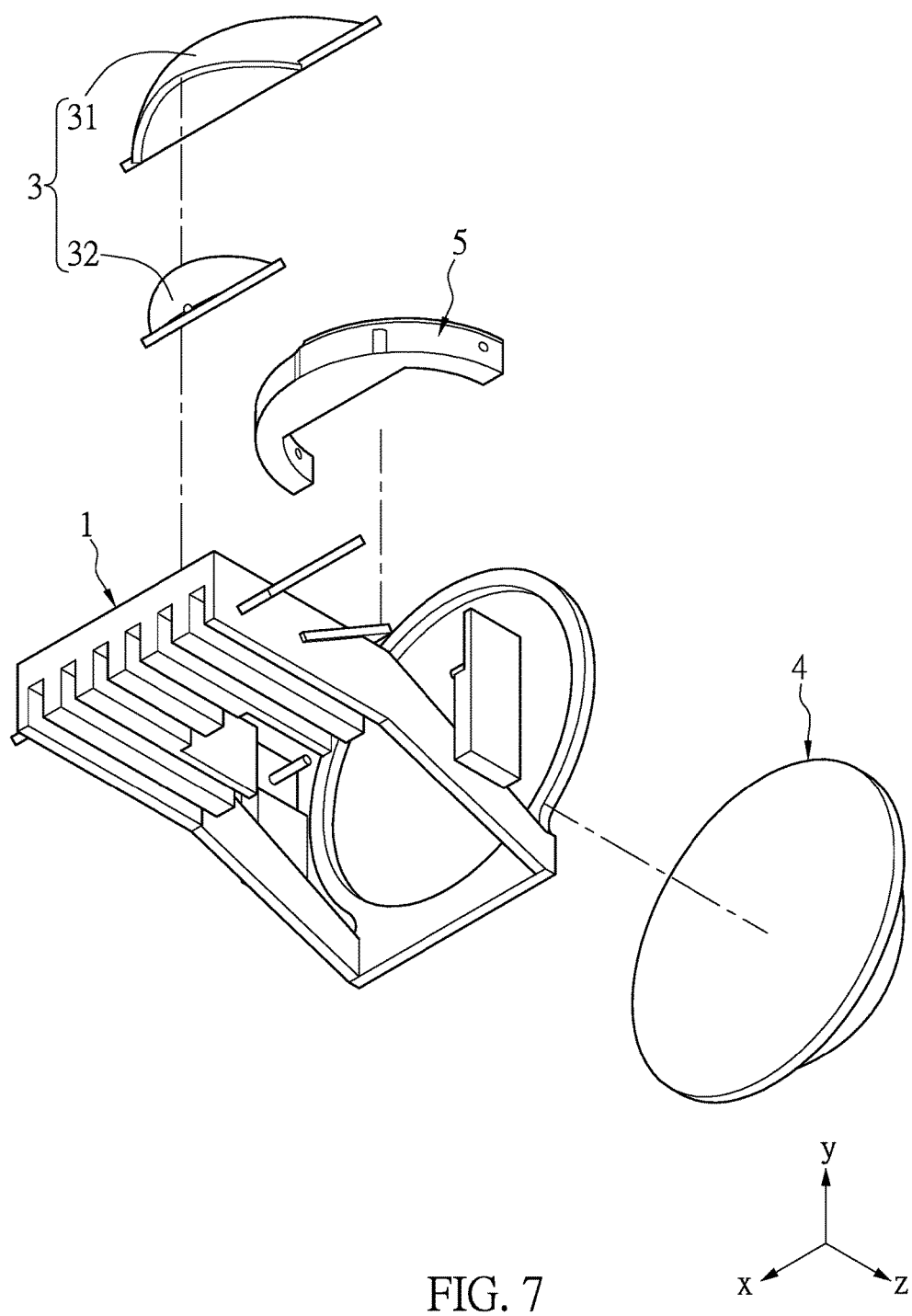
FIG. 7 is another three-dimensional schematic exploded view of the light-projecting device according to the first embodiment of the instant disclosure.

Referring to FIGS. 3 and 4, the lens optical axis A can pass through the first light-emitting structure 21, i.e., the first light-emitting structure 21 is disposed on the lens optical axis A. Accordingly, two opposite sides of the first supporting surface 11 that is used for disposing the first light-emitting structure 21 can respectively have a first recess 111 and a second recess 112. Therefore, the light, which projects to the second reflecting structure 32 and is then reflected by the second reflecting structure 32, will not be shielded by the first supporting surface 11.

Second Embodiment

Figure 16:
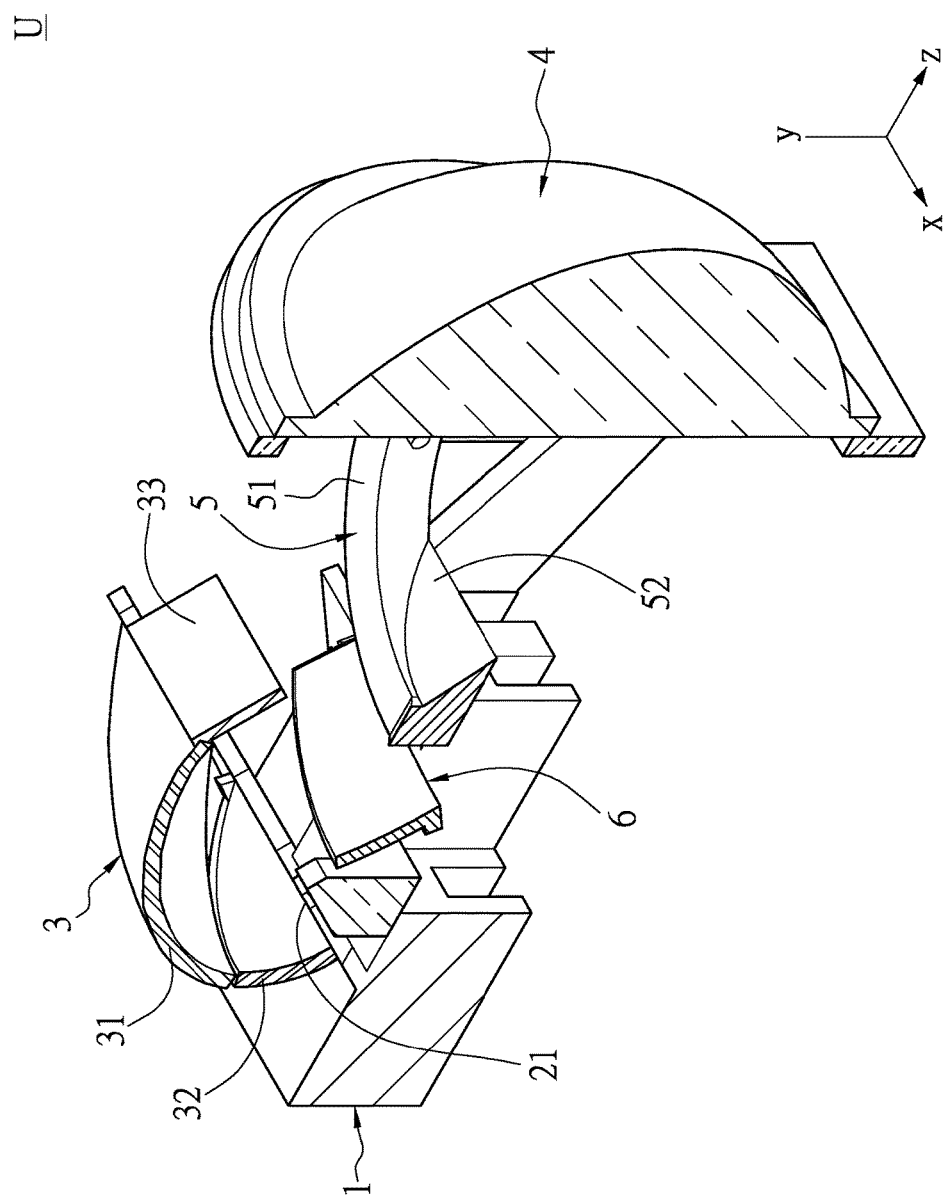
FIG. 16 is a three-dimensional schematic cross-sectional view of the light-projecting device according to the second embodiment of the instant disclosure.

Referring to FIGS. 13 to 16, the second embodiment of the instant disclosure provides a light-projecting device U. In the comparison between FIGS. 8 and 16, the main differences between the second embodiment as shown in FIG. 16 and the first embodiment as shown in FIG. 8 include the light-projecting device U of the second embodiment can further include a second reflecting unit 6 and the first reflecting unit 3 can further include a third reflecting structure 33. The other structural features of the second embodiment are substantially similar to that of the first embodiment, and the detailed descriptions thereof are omitted hereby.

Referring to FIGS. 13 to 16, in the present embodiment, the second reflecting unit 6 can be disposed on the base unit 1 and between the light cut-off unit 5 and the first reflecting unit 3. More specifically, the second reflecting unit 6 can be disposed between the first light-emitting structure 21 and the light cut-off unit 5, and the first reflecting unit 3 can further include a third reflecting structure 33. The first reflecting structure 31 can be disposed between the second reflecting structure 32 and the third reflecting structure 33, and curvatures of the first reflecting structure 31, the second reflecting structure 32, and the third reflecting structure 33 are different from each other. It should be noted that the second reflecting unit 6 can be a non-spherical curved surfaces that is composed of a plurality of curved surfaces of different curvatures or only one curved surface. For example, the second reflecting unit 6 can have a free curved surface or a reflecting structure having elliptical-based or spherical-based composite curved surface(s). The aforesaid curved surface can be a curved surface based on a composite elliptical curve or based on a composite conic curve, or a composite curved surface structure composed of a series of elliptical curves, conic curves or the combination thereof. In other embodiments, the second reflecting unit 6 can be a planar reflecting structure, but the instant disclosure is not limited thereto. Preferably, the second reflecting unit 6 has non-spherical curved surface(s).

Figure 17:
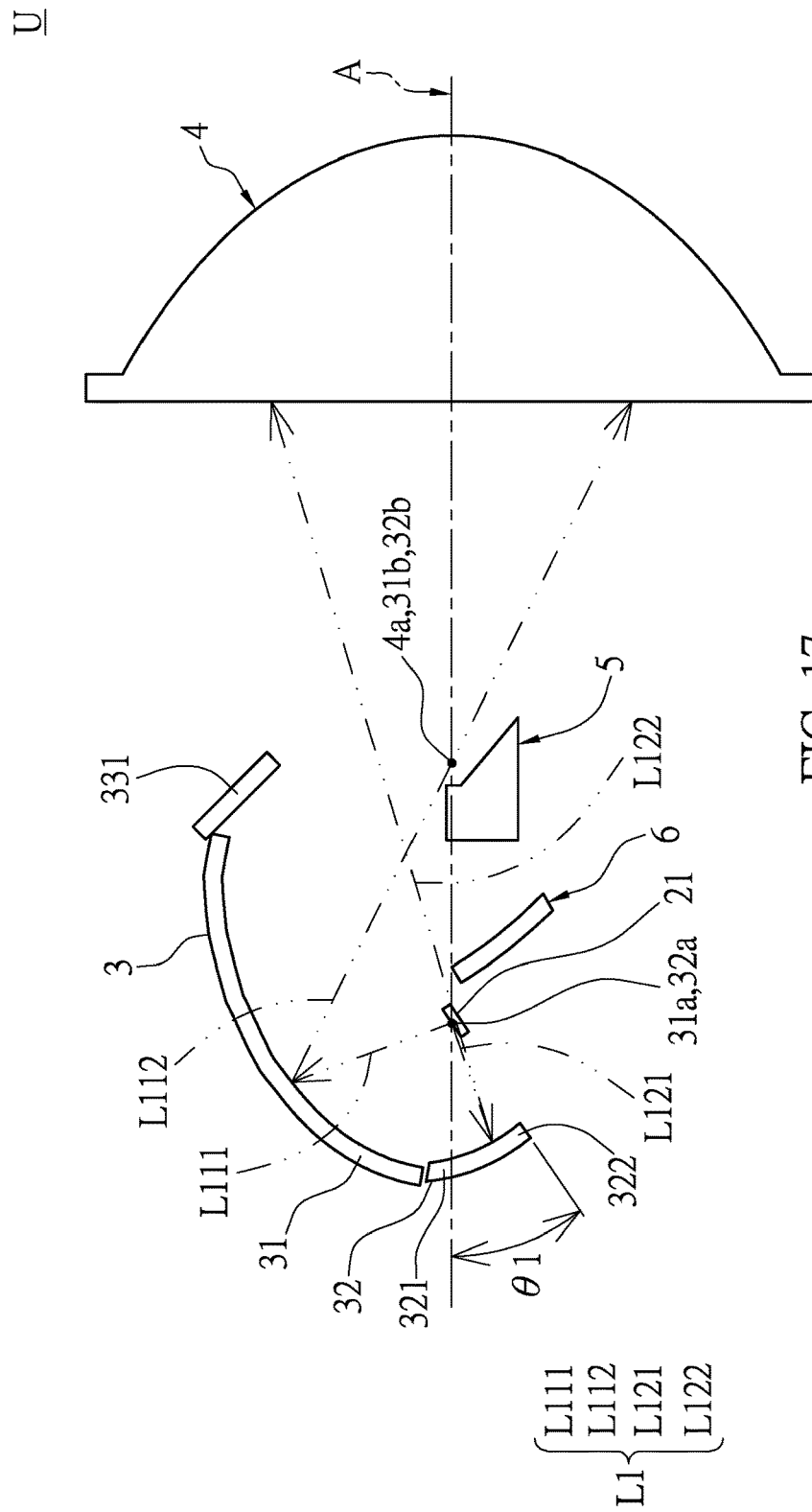
FIG. 17 is a schematic view of the light path inside the light-projecting device according to the second embodiment of the instant disclosure.
Figure 18:
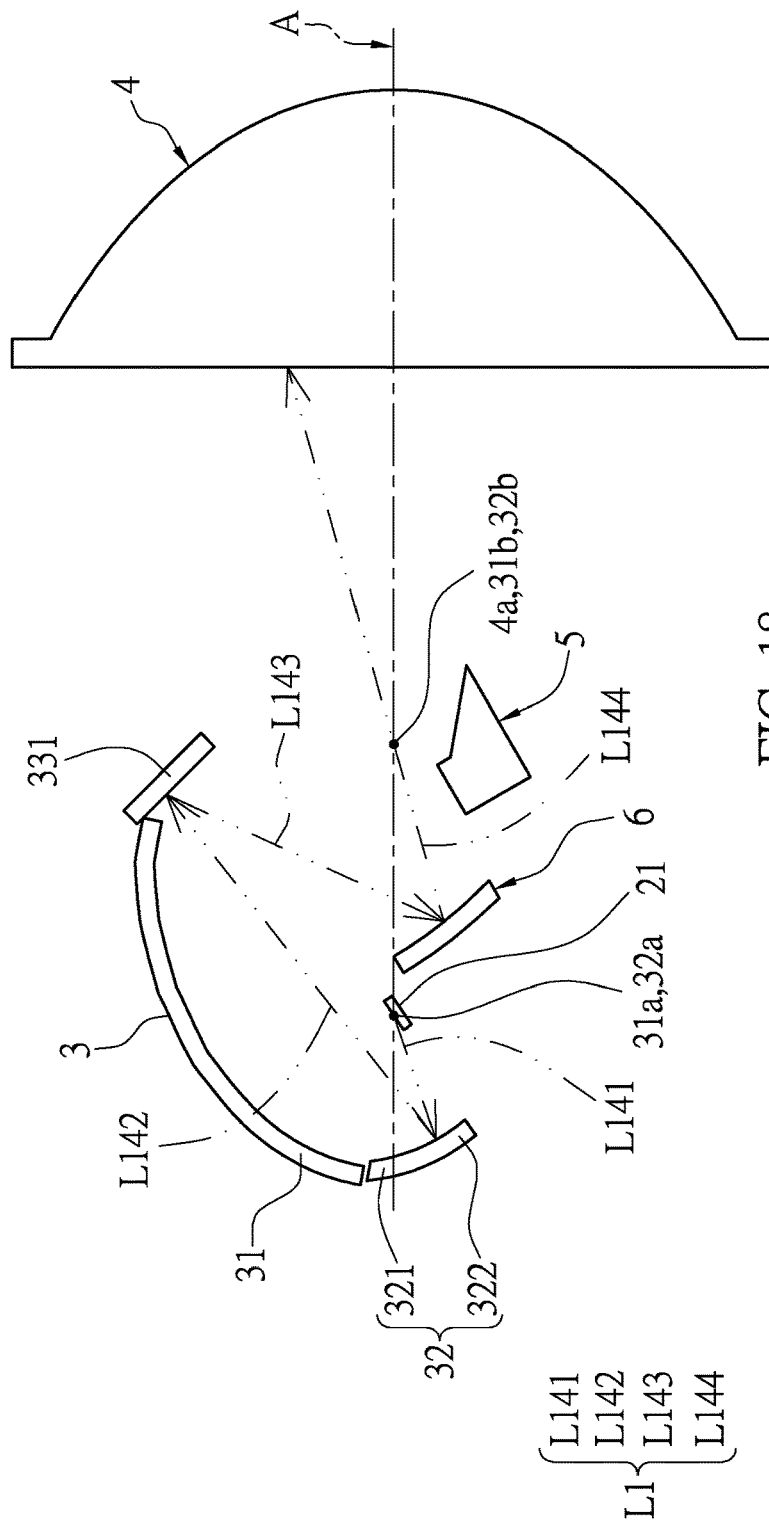
FIG. 18 is another schematic view of the light path inside the light-projecting device according to the second embodiment of the instant disclosure.
Figure 19:
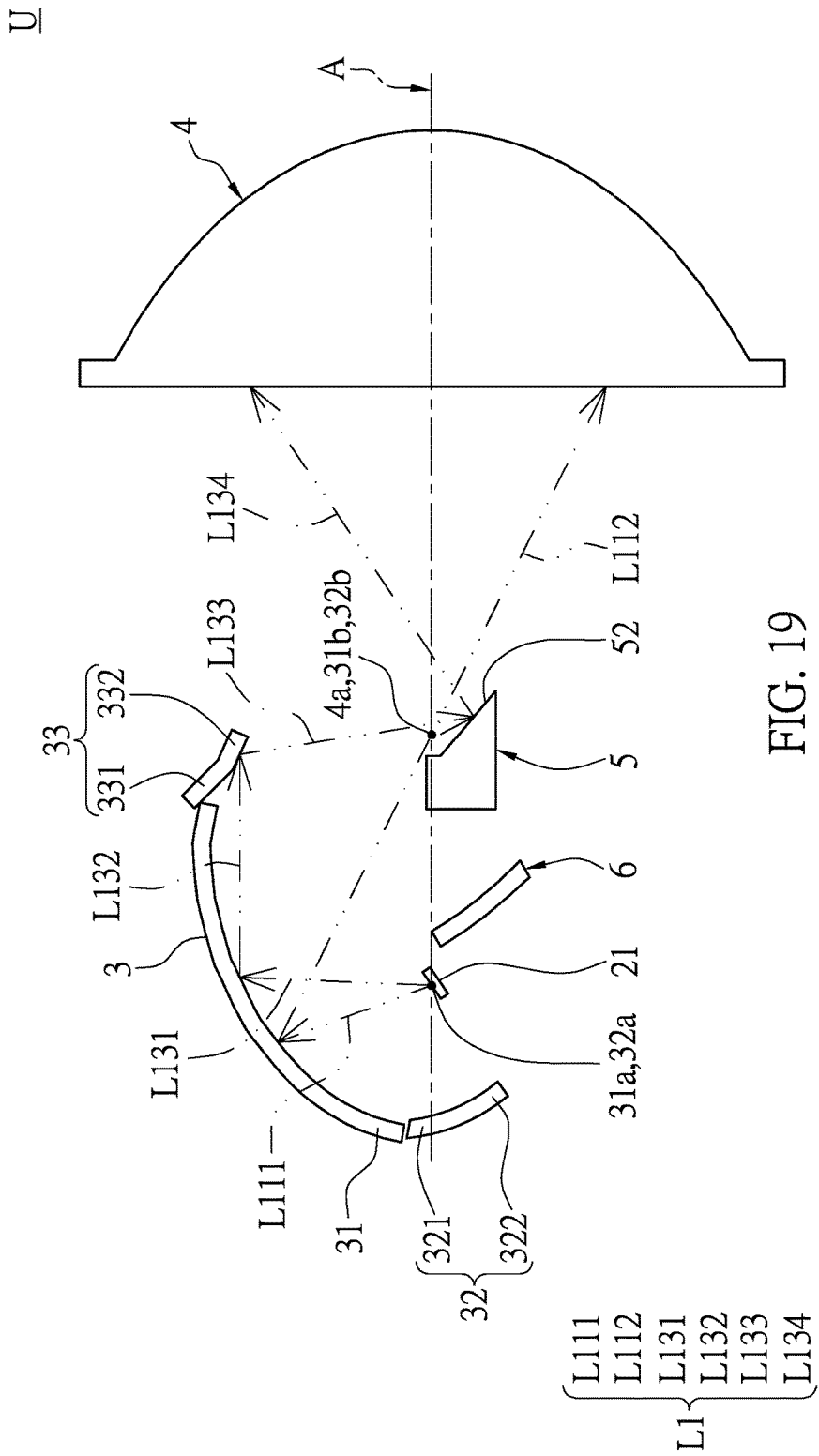
FIG. 19 is still another schematic view of the light path inside the light-projecting device according to the second embodiment of the instant disclosure.
Figure 20:
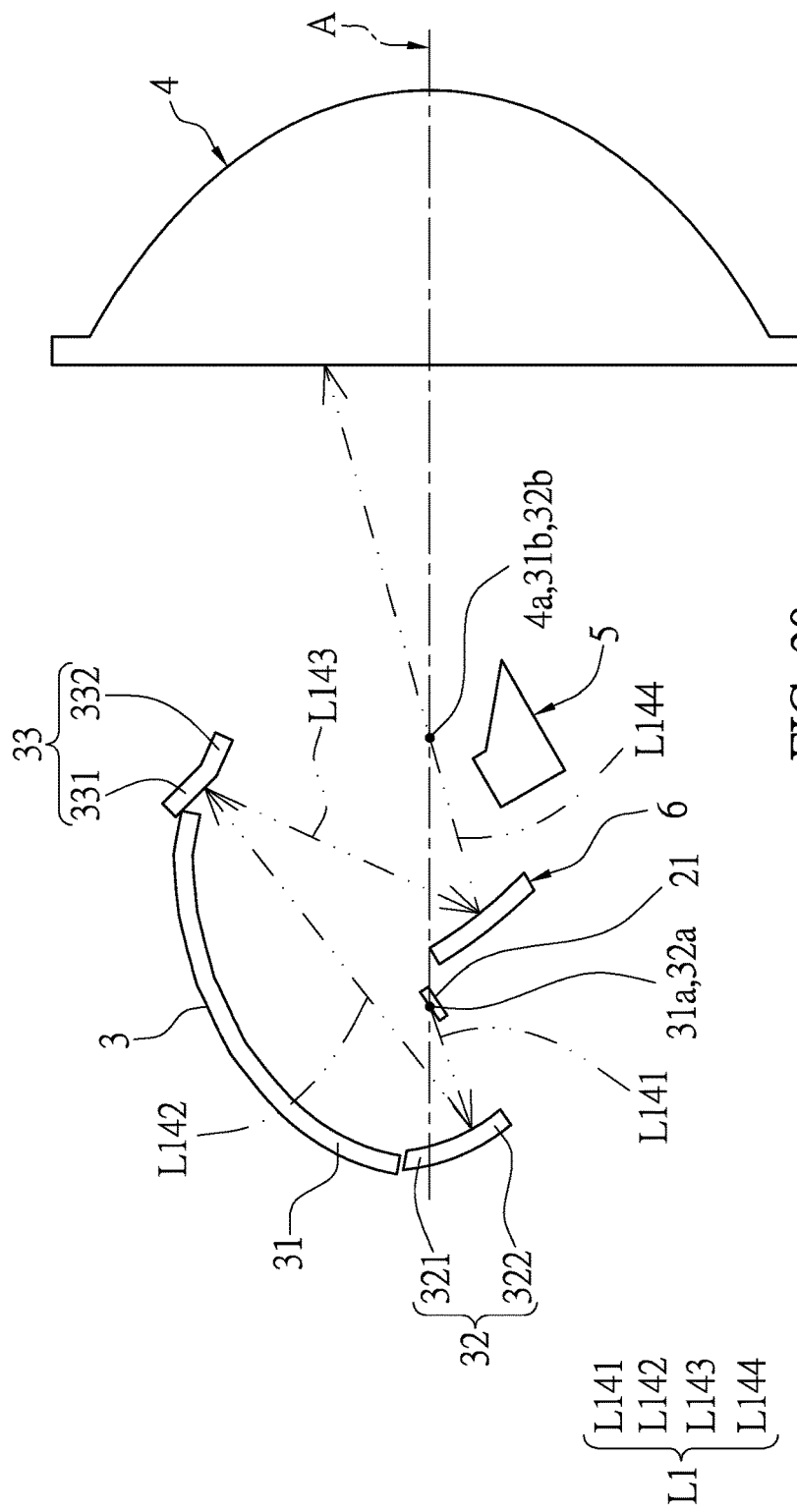
FIG. 20 is another schematic view of the light path inside the light-projecting device according to the second embodiment of the instant disclosure.

Referring to FIGS. 13 to 16 along with FIGS. 17 and 18, in which FIG. 17 shows the low-beam state of the light cut-off unit 5, and FIG. 18 shows the high-beam state of the light cut-off unit 5. As mentioned above, the description about the projection directions of the first projection light 111 and the second projection light 112 is omitted herein. Referring to FIG. 18, for example, the third reflecting structure 33 can include a first reflecting portion (not numbered). Referring to FIGS. 19 and 20, in other examples, the third reflecting structure 33 can further include a second reflecting portion 332 connected to the first reflecting portion 331. The first reflecting portion 331 has a different slope from the second reflecting portion 332.

Referring to FIG. 18, the following will describe in detail the functions of the third reflecting structure 33 and the second reflecting unit 6, and the example of the third reflecting structure 33 that includes a first reflecting portion. More specifically, the first light-emitting structure 21 can generate a first light L1. The first light L1 can include a fourth projection light L141 projecting toward the second reflecting structure 32. The fourth projection light L141 can be reflected by the second reflecting structure 32 to produce a sixth reflection light L142 projecting toward the first reflecting portion 331 of the third reflecting structure 33. The sixth reflection light L142 is reflected by the first reflecting portion 331 of the third reflecting structure 33 to produce a seventh reflection light L143 projecting toward the second reflecting unit 6. The seventh reflection light L143 is reflected by the second reflecting unit 6 to produce an eighth reflection light L144 projecting toward the lens unit 4. Therefore, the light-concentrating efficiency and the light-condensing effect of the light-projecting device U in the high-beam state can be enhanced in the presence of the third reflecting structure 33 and the second reflecting unit 6.

It should be noted that the second reflecting structure 32, the third reflecting structure 33, and the second reflecting unit 6 can contribute to producing the high-beam of the second embodiment. In practice, the fourth focal point 32b of the second reflecting structure 32 is not positioned on the lens optical axis A, rather, it is focused on the lens optical axis A via the third reflecting structure 33 and the second reflecting unit 6. That is to say, the fourth focal point 32b as shown in FIG. 18 is a virtual focal point. Furthermore, in practice, the fourth focal point 32b of the second reflecting structure 32 can be positioned between the second reflecting structure 32 and the third reflecting structure 33, or positioned out of the third reflecting structure 33, but the instant disclosure is not limited thereto.

Reference is made next to FIGS. 19 and 20, in which FIG. 19 shows the low-beam state of the light cut-off unit 5, and FIG. 20 shows the high-beam state of the light cut-off unit 5. The following will describe an example of the third reflecting structure 33 that includes a first reflecting portion 331 and a second reflecting portion 332 connected to the first reflecting portion 331, and in which the first reflecting portion 331 has a different slope from the second reflecting portion 332. In the second embodiment, the light cut-off unit 5 can include a light cut-off plate 51 and a residual-light reflecting plate 52 disposed on the light cut-off plate 51. The illumination of the dark zone (i.e., Zone III as dictated by regulations) can be provided by the residual-light reflecting plate 52. In addition, the residual-light reflecting plate 52 can have an inclination angle (not numbered) between 2 and 60 degrees relative to the lens optical axis A, but the instant disclosure is not limited thereto. In other words, the inclination angle of the residual-light reflecting plate 52 can be adjusted according to the second reflecting portion 332 of the third reflecting structure 33.

Referring to FIG. 19, the first light-emitting structure 21 can generate a first light L1. The first light L1 includes a first projection light L111 and a third projection light L131 that project toward the first reflecting structure 31. The first projection light L111 is reflected by the first reflecting structure 31 to produce a first reflection light L112 projecting toward the lens unit 4. The third projection light L131 is reflected by the first reflecting structure 31 to produce a third reflection light L132 projecting toward the second reflecting portion 332 of the third reflecting structure 33. The third reflection light L32 is reflected by the second reflecting portion 332 of the third reflecting structure 33 to produce a fourth reflection light L133 projecting toward the residual-light reflecting plate 52 of the light cut-off unit 5. The fourth reflection light L133 is reflected by the residual-light reflecting plate 52 to produce a fifth reflection light L134 projecting toward the lens unit 4. The person skilled in the art should know other means for illuminating the dark zone, so that the instant disclosure in not limited to the aforesaid means for illuminating the dark zone.

Referring to FIG. 20, the first light L1 can include a fourth projection light L141 projecting toward the second reflecting structure 32. The fourth projection light L141 is reflected by the second reflecting structure 32 to produce a sixth reflection light L142 projecting toward the first reflecting portion 331 of the third reflecting structure 33. The sixth reflection light L142 is reflected by the first reflecting portion 331 of the third reflecting structure 33 to produce a seventh projection light L143 projecting toward the second reflecting unit 6. The seventh projection light L143 is reflected by the second reflecting unit 6 to produce an eighth reflection light L144 projecting toward the lens unit 4. The example as shown in FIG. 20 is substantially the same as the example as shown in FIG. 18, and the description thereof is omitted herein.

Figure 21:
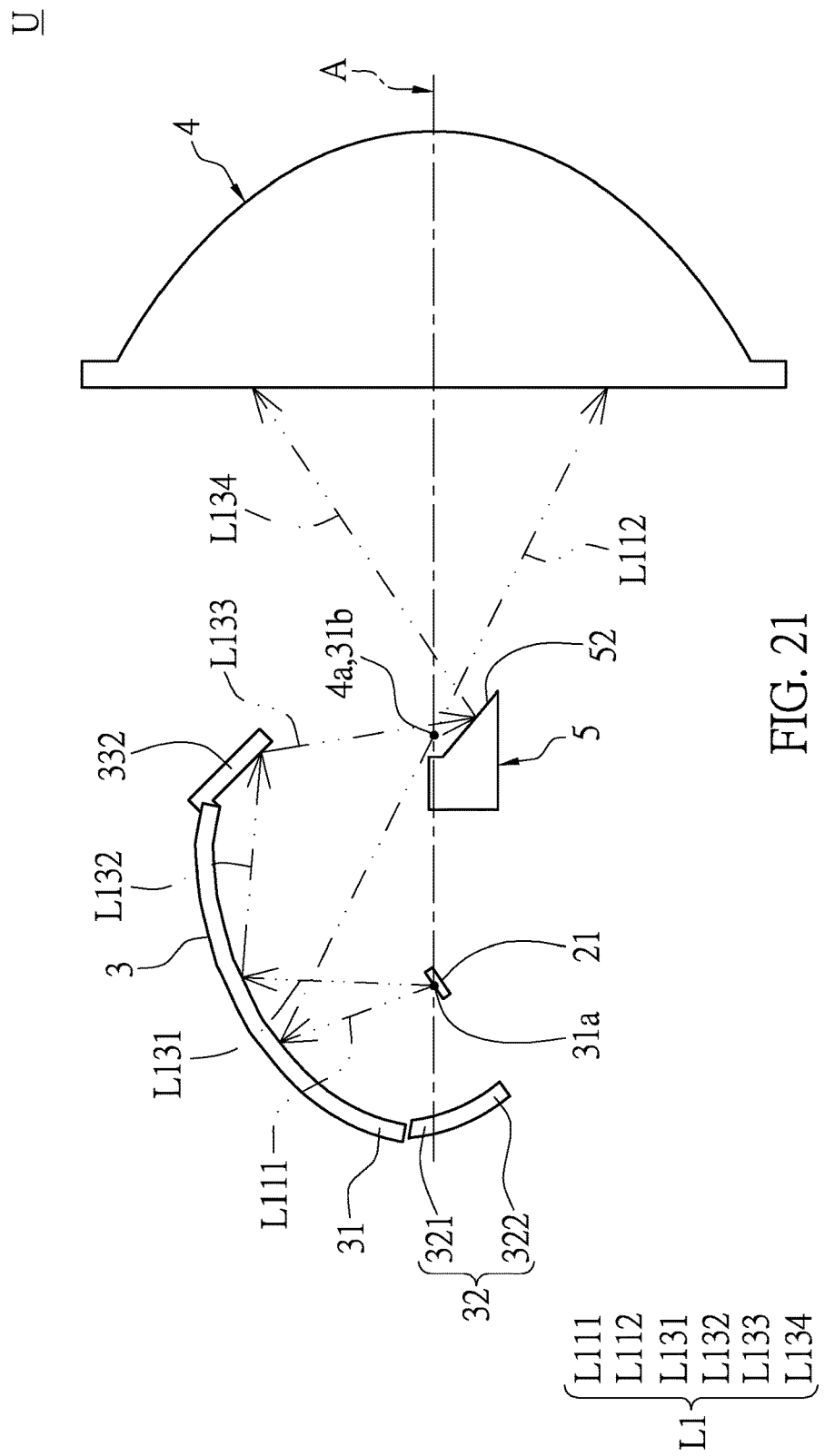
FIG. 21 is another schematic view of the light path inside the light-projecting device according to the second embodiment of the instant disclosure.

Referring to FIG. 21, in the comparison between FIG. 21 and FIGS. 18 and 19, the main differences between the example as shown in FIG. 21 and the example as shown in FIGS. 18 and 19 is that the light-projecting device U of the example as shown in FIG. 21 can include only the third reflecting structure 33 and need not include the second reflecting unit 6. In the example as shown in FIG. 21, the third reflecting structure 33 can only include a second portion (not numbered), and the illumination of the dark zone can be provided by the third reflecting structure 33 and the residual-light reflecting plate 52 of the light cut-off unit 5. The function of the second reflecting portion 332 is the same as mentioned in the example as shown in FIG. 19. That is to say, the third projection light L131 is reflected by the first reflecting structure 31 to produce a third reflection light L132 projecting toward the second reflecting portion 332 of the third reflecting structure 33. The third reflection light L32 is reflected by the second reflecting portion 332 of the third reflecting structure 33 to produce a fourth reflection light L133 projecting toward the residual-light reflecting plate 52 of the light cut-off unit 5. The fourth reflection light L133 is reflected by the residual-light reflecting plate 52 to produce a fifth reflection light L134 projecting toward the lens unit 4.

Figure 22:
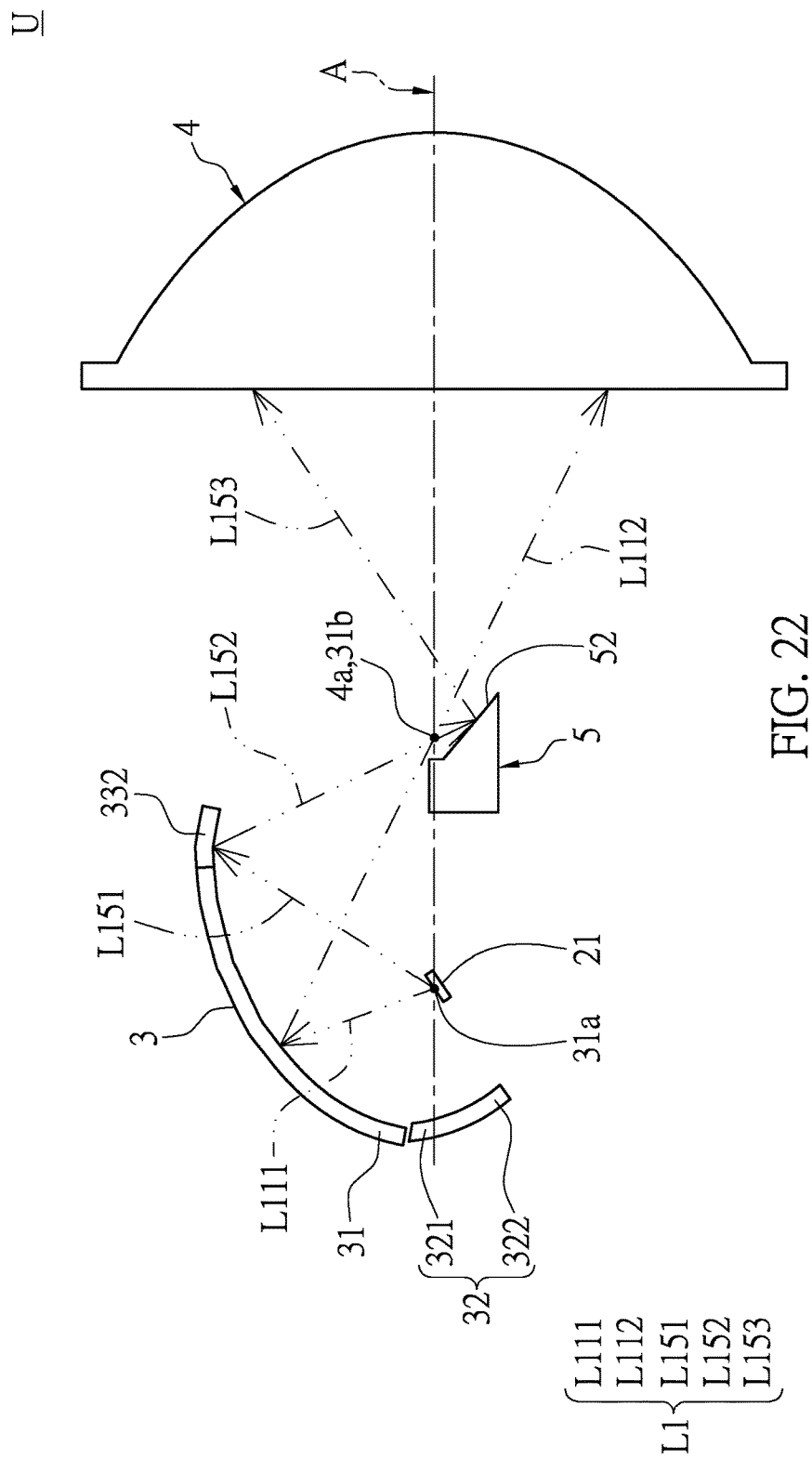
FIG. 22 is another schematic view of the light path inside the light-projecting device according to the second embodiment of the instant disclosure.
Figure 23:
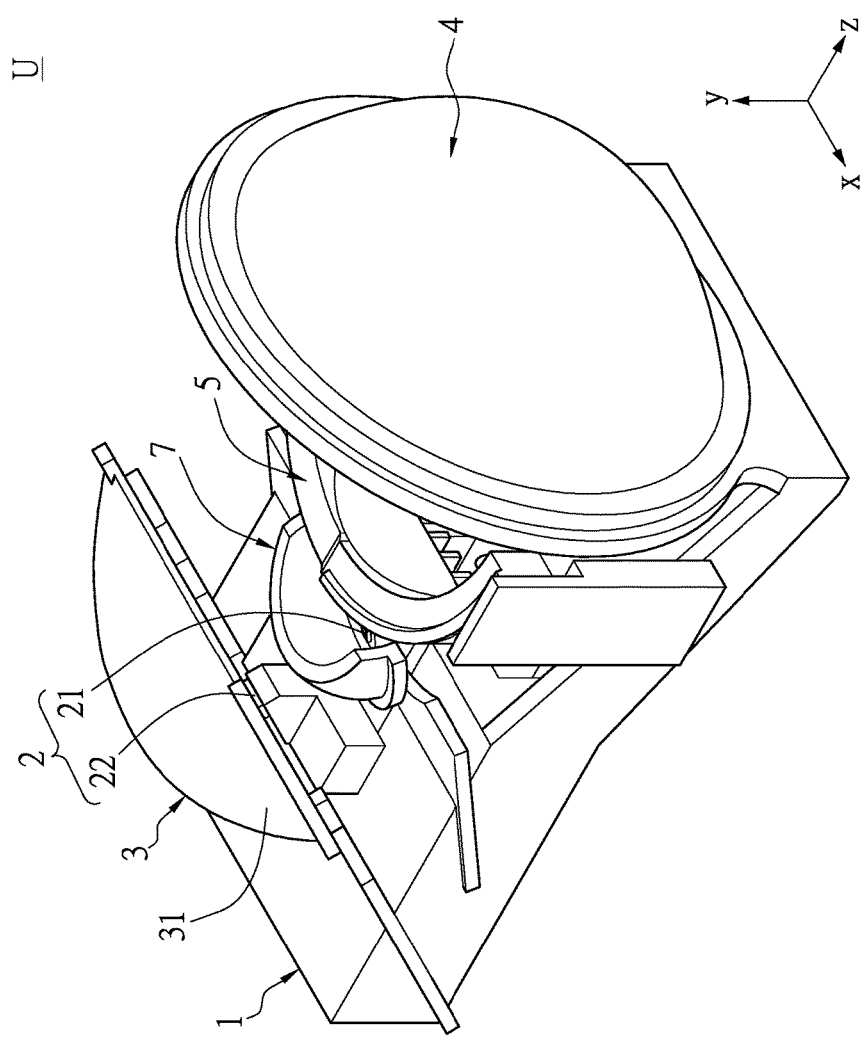
FIG. 23 is a three-dimensional schematic assembled view of the light-projecting device according to the third embodiment of the instant disclosure.
Figure 24:
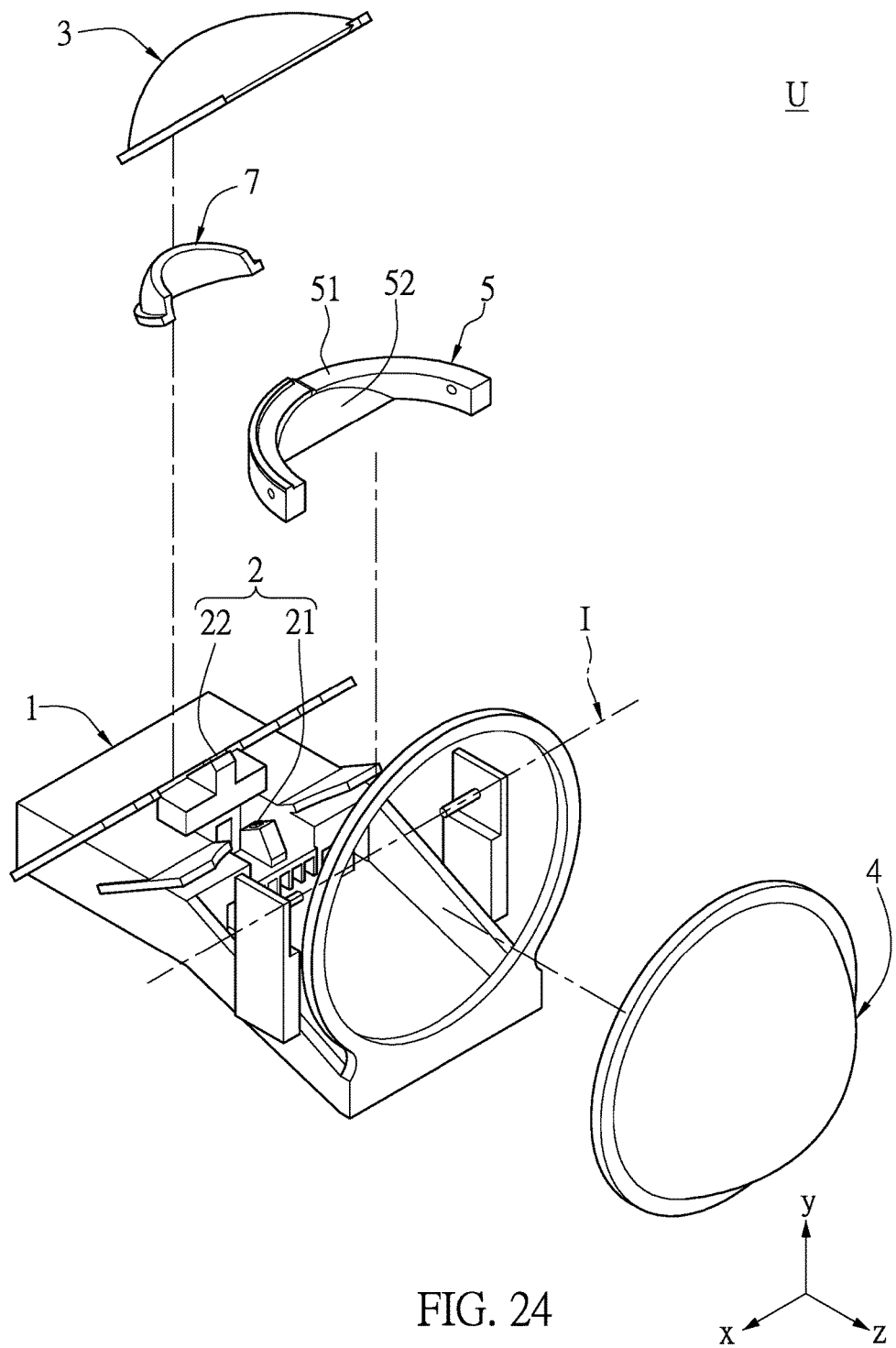
FIG. 24 is a three-dimensional schematic exploded view of the light-projecting device according to the third embodiment of the instant disclosure.
Figure 25:
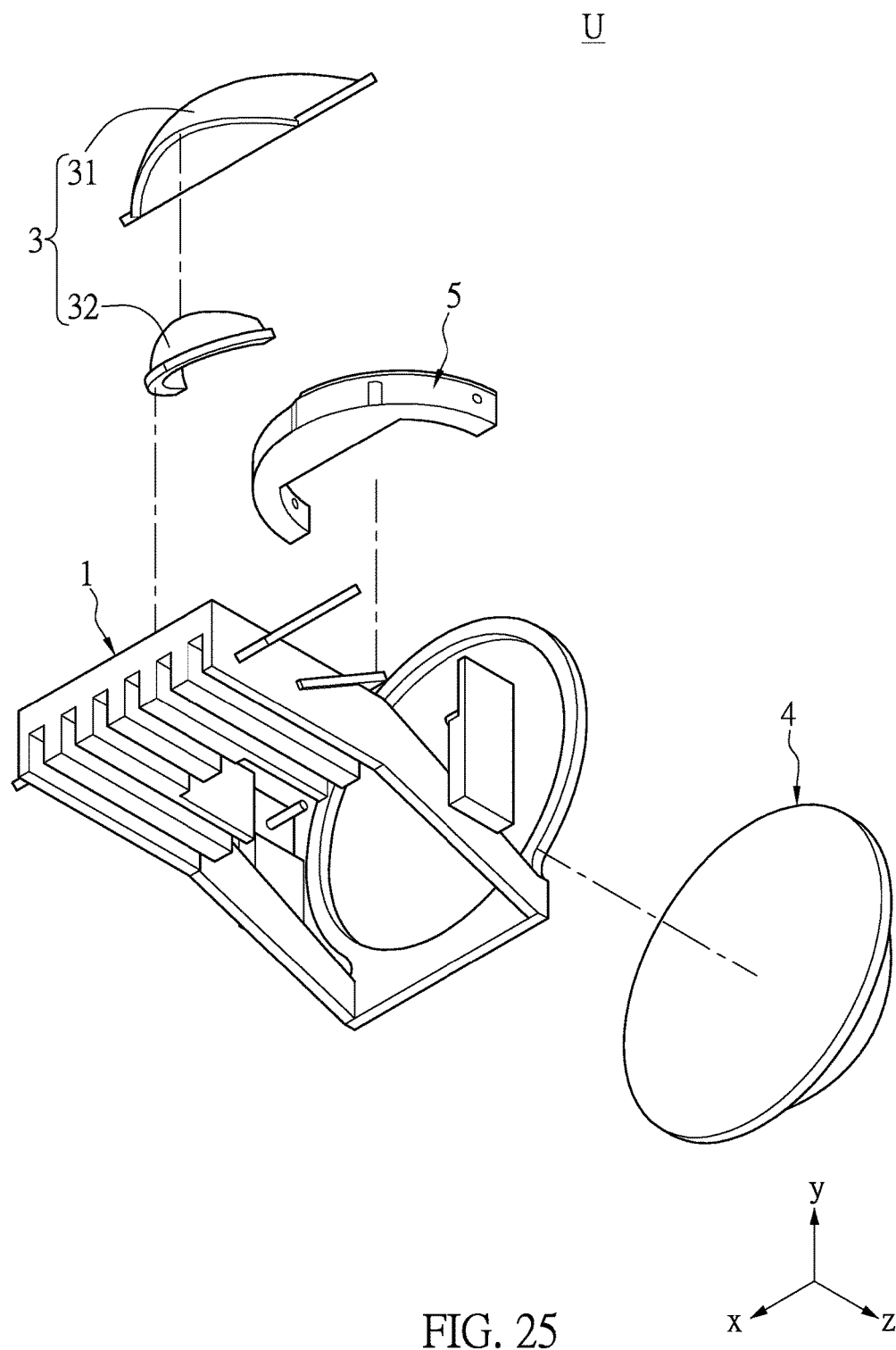
FIG. 25 is another three-dimensional schematic exploded view of the light-projecting device according to the third embodiment of the instant disclosure.
Figure 26:
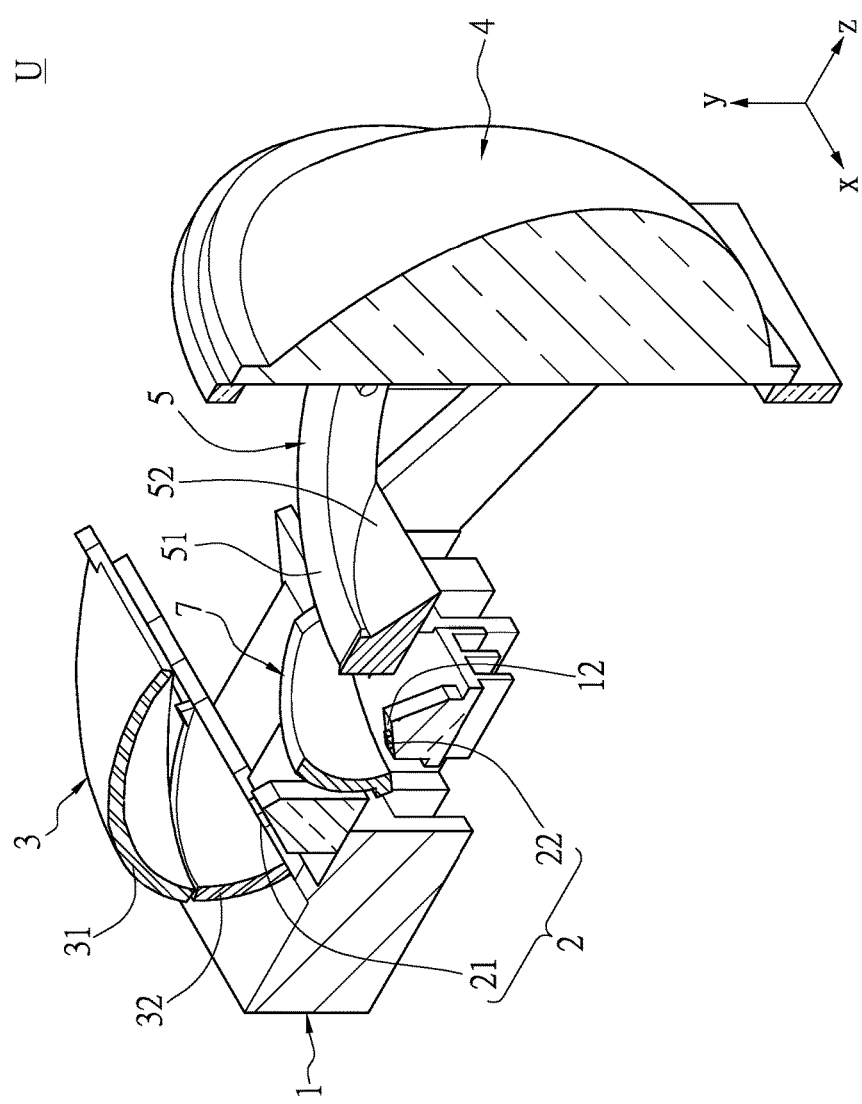
FIG. 26 is a three-dimensional schematic cross-sectional view of the light-projecting device according to the third embodiment of the instant disclosure.

Referring to FIG. 22, the following will take an example to describe the other means for illuminating the dark zone. The third reflecting structure 33, as shown in FIG. 22, can be connected to the first reflecting structure 31 and include a second reflecting portion 332. In the example as shown in FIG. 22, the first reflecting structure 31 and the third reflecting structure 33 can have different shapes from that of the aforesaid examples. More specifically, the first light-emitting structure 21 can generate a first light L1. The first light L1 can includes a first projection light L111 projecting toward the first reflecting structure 31 and a fifth projection light L151 projecting toward the second reflecting portion 332 of the third reflecting structure 33. The first projection light L111 is reflected by the first reflecting structure 31 to produce a first reflection light L112 projecting toward the lens unit 4. The fifth projection light L151 is reflected by the second reflecting portion 332 of the third reflecting structure 33 to produce a ninth reflection light L152 projecting toward the residual-light reflecting plate 52 of the light cut-off unit 5. The ninth reflection light L152 is reflected by the residual-light reflecting plate 52 of the light cut-off unit 5 to produce a tenth reflection light L153 projecting toward the lens unit 4.

Third Embodiment

Referring to FIGS. 23 to 26, the third embodiment of the instant disclosure provides a light-projecting device U. In comparison between the FIGS. 21 and 24, the main differences between the third embodiment and the first embodiment include the light-projecting device U of the third embodiment can further include a third reflecting unit 7 and the light-emitting unit 2 can further include a second light-emitting structure 22 disposed on a second supporting surface 12 of the base unit 1. The other structural features of the third embodiment are substantially similar to that of the aforesaid embodiments, and the detailed descriptions thereof are omitted hereby. That is to say, the light-projecting device U of the third embodiment can include a third reflecting structure 33.

Referring to FIGS. 23 to 26, the third reflecting unit 7 can be disposed on the base unit 1. The second light-emitting structure 22 can be disposed on the base unit 1 and have a second light-emitting surface 22S. In addition, the second light-emitting structure 22 is, for example, a light-emitting diode (LED). Therefore, the second light-emitting surface 22S can act as a uniform surface light source. In the present embodiment, the second light-emitting structure 22 can be a lambert radiator or that resembling a lambert radiator. The second light-emitting surface 22S can act as a lambert light source, and it can emit at least a second light L2 having an angle between −80 and 80 degrees. In the present embodiment, the second light-emitting surface 22S can be inclined relative to the lens optical axis A. For example, the second light-emitting surface 22S can have a predetermined angle $\theta 2$ between 0 and 60 degrees, that is, the second light-emitting surface 22S can be parallel to the lens optical axis A with an angle of 0 degree therebetween. That is to say, the normal line of the second light-emitting surface 22S extends at an inclination angle toward a direction at the back side of the lens unit 4.

In the present embodiment, the third reflecting unit 7 can be composed of a plurality of curved surfaces of different curvatures or only one curved surface. For example, the third reflecting unit 7 can be a reflecting structure having elliptical-based surface(s) with curvature(s). The following will describe the example of the third reflecting unit 7 having elliptical curved surface(s). More specifically, the third reflecting unit 7 can have a fifth focal point 7a and a sixth focal point 7b corresponding in position to the fifth focal point 7a. The second light-emitting structure 22 can be disposed in positional correspondence with the fifth focal point 7a of the third reflecting unit 7. The sixth focal point 7b can coincide with or in the vicinity of the lens focal point 4a. Preferably, the second light-emitting structure 22 can be disposed on the fifth focal point 7a and the sixth focal point 7b can coincide with or in the vicinity of the lens focal point 4a, but the instant disclosure is not limited thereto.

Figure 27:
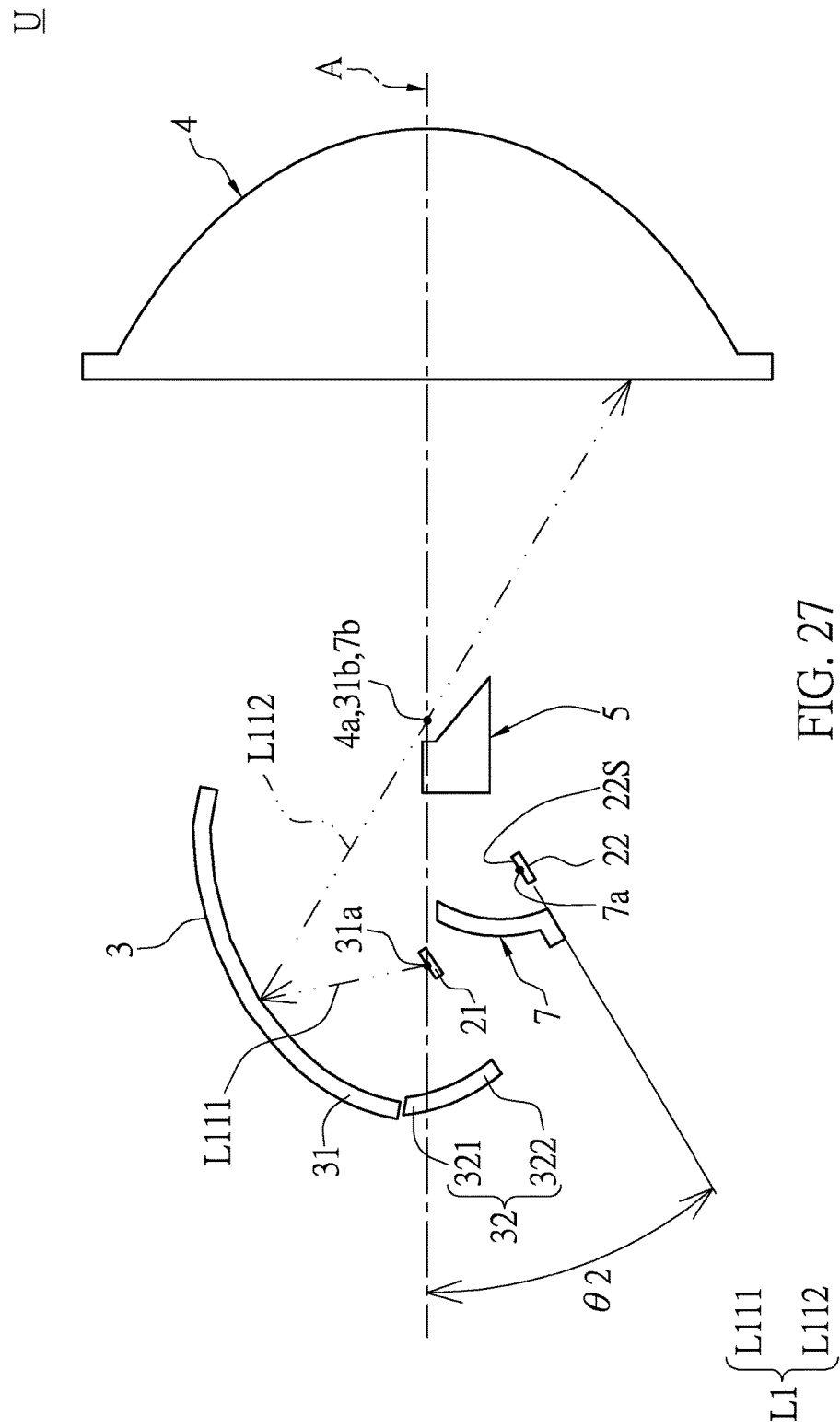
FIG. 27 is another schematic view of the light path inside the light-projecting device according to the second embodiment of the instant disclosure.
Figure 28:
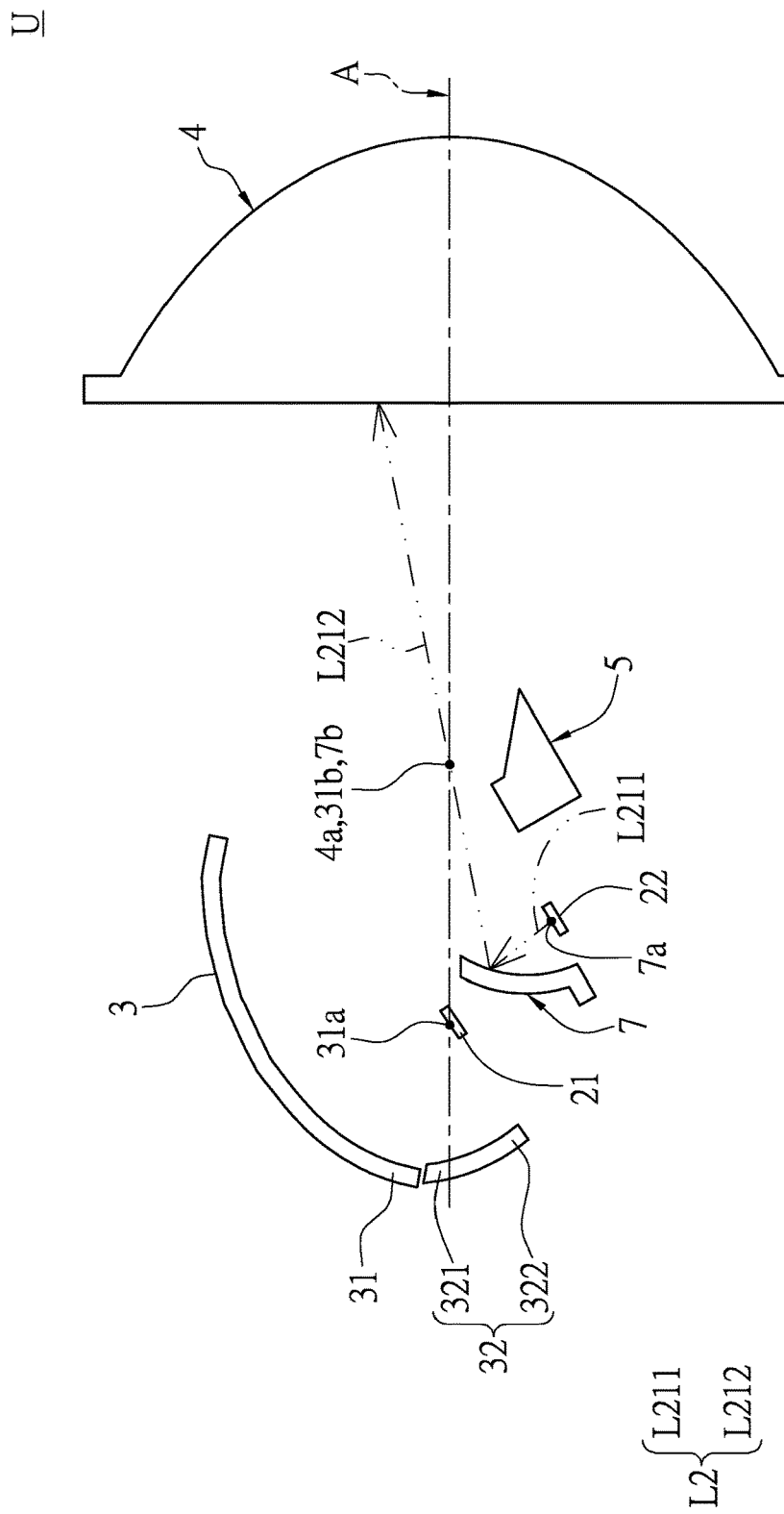
FIG. 28 is another schematic view of the light path inside the light-projecting device according to the second embodiment of the instant disclosure.

Reference is made to FIGS. 23 to 26 along with FIGS. 27 and 28, in which FIG. 27 shows the low-beam state of the light cut-off unit 5, and FIG. 28 shows the high-beam state of the light cut-off unit 5. As mentioned above, the first light-emitting structure 21 can generate a first light L1. The first light L1 can include a first projection light L111 projecting toward the first reflecting structure 31. The first projection light L111 is reflected by the first reflecting structure 31 to produce a first reflection light L112 projecting toward the lens unit 4. When the light-projecting device U includes the third reflecting structure 33 and the residual-light reflecting plate 52, the light path thereof can be used to provide the illumination of the dark zone, as mentioned in aforesaid embodiments.

Referring to FIG. 28, the second light-emitting structure 22 can generate a second light L2. The second light L2 includes a sixth projection light L211 projecting toward the third reflecting unit 7. The sixth projection light L211 is reflected by the third reflecting unit 7 to produce an eleventh reflection light L212 projecting toward the lens unit 4.

One of the advantages of the instant disclosure is that the light-projecting device can utilize the technical solution of "the first light-emitting surface 21S being inclined relative to the lens optical axis A" to enhance the light condensing effect of the light-projecting device.

Furthermore, when the first light-emitting structure 21 is disposed on the lens optical axis A and the first light-emitting surface 21S thereof is inclined relative to the lens optical axis A, the light-concentrating efficiency and the light-condensing effect can be enhanced as much as possible.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A light-projecting device, comprising:
  a base unit;
  a light-emitting unit, disposed on the base unit and including a first light-emitting structure, wherein the first light-emitting structure has a first light-emitting surface;
  a first reflecting unit, disposed on the base unit and corresponding in position to the light-emitting unit; and
  a lens unit, corresponding in position to the first reflecting unit and having a lens optical axis;
  wherein the first light-emitting surface is inclined relative to the lens optical axis
  wherein the first light-emitting surface acts as a lambert light source, the lambert light source is configured to emit at least a first light at an angle between −80 and 80 degrees, and the first reflecting unit shields a portion of the first light of the lambert light source that is at an angle between −70 and 70 degrees.

2. The light-projecting device of claim 1, wherein the first reflecting unit includes a first reflecting structure and a second reflecting structure, and the first reflecting structure has a curvature same as a curvature of the second reflecting structure or different from the curvature of the second reflecting structure.

3. The light-projecting device of claim 1, wherein the first reflecting unit includes a first reflecting structure that has a first focal point and a second focal point corresponding in position to the first focal point, the lens unit has a lens focal point that is positioned on the lens optical axis, and the second focal point of the first reflecting structure is in the vicinity of or coincides with the lens focal point.

4. The light-projecting device of claim 1, wherein the first reflecting unit includes a first reflecting structure and a second reflecting structure, and the first reflecting structure has a curvature different from a curvature of the second reflecting structure.

5. The light-projecting device of claim 4, further comprising a light cut-off unit disposed on the base unit, wherein a lighting pattern with a cut-off line is produced when a first light generated from the first light-emitting structure is selectively shielded by the light cut-off unit.

6. The light-projecting device of claim 5, wherein the first reflecting unit further includes a third reflecting structure disposed between the first reflecting structure and the second reflecting structure, and the third reflecting structure has a curvature that is different from that of the first reflecting structure and the second reflecting structure.

7. The light-projecting device of claim 6, wherein the first light generated from the first light-emitting structure includes a first projection light projecting toward the first reflecting structure and a second projection light projecting toward the second reflecting structure, the first projection light is reflected by the first reflecting structure to produce a first reflection light projecting toward the lens unit, and the second projection light is reflected by the second reflecting structure to produce a second reflection light projecting toward the lens unit.

8. The light-projecting device of claim 6, wherein the light cut-off unit includes a light cut-off plate and a residual-light reflecting plate disposed on the light cut-off plate, the third reflecting structure includes a first reflecting portion and a second reflecting portion connected to the first reflecting portion, and the first reflecting portion has a slope that is different from that of the second reflecting portion, and wherein the first light generated from the first light-emitting structure includes a first projection light projecting toward the first reflecting structure and a third projection light projecting toward the first reflecting structure, the first projection light is reflected by the first reflecting structure to produce a first reflection light projecting toward the lens unit, the third projection light is reflected by the first reflecting structure to produce a third reflection light projecting toward the second reflecting portion of the third reflecting structure, the third reflection light is reflected by the second reflecting portion of the third reflecting structure to produce a fourth reflection light projecting toward the residual-light reflecting plate of the light cut-off unit, and the fourth reflection light is reflected by the residual-light reflecting plate to produce a fifth reflection light projecting toward the lens unit.

9. The light-projecting device of claim 8, wherein the first light generated from the first light-emitting structure includes a fifth projection light projecting toward the second reflecting portion of the third reflecting structure, the fifth projection light is reflected by the second reflecting portion of the third reflecting structure to produce a ninth reflection light projecting toward the residual-light reflecting plate of the light cut-off unit, and the ninth reflection light is reflected by the residual-light reflecting plate to produce a tenth reflection light projecting toward the lens unit.

10. The light-projecting device of claim 4, further comprising a light cut-off unit and a second reflecting unit, wherein the light cut-off unit is disposed on the base unit, the second reflecting unit is disposed on the base unit and between the light cut-off unit and the first reflecting unit, the first reflecting unit further includes a third reflecting structure, the first reflecting structure is disposed between the second reflecting structure and the third reflecting structure, curvatures of the first reflecting structure, the second reflecting structure and the third reflecting structure are different from each other, and the third reflecting structure includes a first reflecting portion.

11. The light-projecting device of claim 10, wherein the first light-emitting structure is configured to generate a first light, the first light includes a first projection light projecting toward the first reflecting structure and a fourth projection light projecting toward the second reflecting structure, the first projection light is reflected by the first reflecting structure to produce a first reflection light projecting toward the lens unit, the fourth projection light is reflected by the second reflecting structure to produce a sixth reflection light projecting toward the first reflecting portion of the third reflecting structure, the sixth reflection light is reflected by the first reflecting portion of the third reflecting structure to produce a seventh projection light projecting toward the second reflecting unit, and the seventh projection light is reflected by the second reflecting unit to produce an eighth reflection light projecting toward the lens unit.

12. The light-projecting device of claim 1, further comprising a third reflecting unit, wherein the light-emitting unit further includes a second light-emitting structure, the third reflecting unit is disposed on the base unit, and the second light-emitting structure has a second light-emitting surface that is inclined relative to the lens optical axis.

13. The light-projecting device of claim 12, wherein the second light-emitting structure is configured to generate a second light, the second light includes a sixth projection light projecting toward third reflecting unit, and the sixth projection light is reflected by the third reflecting unit to produce an eleventh reflection light projecting toward the lens unit.

14. The light-projecting device of claim 1, wherein the lens optical axis passes through the first light-emitting surface.

15. The light-projecting device of claim 1, wherein the lens optical axis passes through the second reflecting structure.

16. A light-projecting device, comprising:
a base unit;
a light-emitting unit, disposed on the base unit and including a first light-emitting structure, wherein the first light-emitting structure has a first light-emitting surface;
a first reflecting unit, disposed on the base unit and corresponding in position to the light-emitting unit; and
a lens unit, corresponding in position to the first reflecting unit and having a lens optical axis;
wherein the first light-emitting surface is inclined relative to the lens optical axis;
wherein the first light-emitting surface acts as a lambert light source, the lambert light source is configured to emit at least a first light, and the first reflecting unit shields at least 60% of the first light of the lambert light source.

* * * * *